United States Patent
Sweeney

Patent Number: 5,118,397
Date of Patent: * Jun. 2, 1992

[54] CONVERSION OF CELLULOSIC AGRICULTURAL WASTES

[76] Inventor: Charles T. Sweeney, 2601 Great Oak, Round Rock, Tex. 78681

[*] Notice: The portion of the term of this patent subsequent to Jul. 16, 2008 has been disclaimed.

[21] Appl. No.: 593,028

[22] Filed: Oct. 5, 1990

[51] Int. Cl.$^5$ ............................................. A23K 1/00
[52] U.S. Cl. ............................... 204/131; 204/103; 426/615; 426/635; 426/636; 426/807
[58] Field of Search ............... 204/103, 131; 426/615, 426/635, 636, 807

[56] References Cited

U.S. PATENT DOCUMENTS 3,920,801  11/1975  Grotheer ........................... 204/103
4,649,113   3/1987  Gould ................................ 426/636

Primary Examiner—John Niebling
Assistant Examiner—Arun S. Phasge
Attorney, Agent, or Firm—Neal J. Mosely

[57] ABSTRACT

A method for conversion of comminuted cellulosic agricultural wastes into a form edible by ruminant animals comprises treating such wastes, e.g., straw, corn stalks and husks, cotton wastes, peanut shells, saw dust, etc. by spraying with an aqueous solution of a mixed oxidant gas, at a pH of about 11–12, to produce a total water content of less than 20%, a pH of about 11.4–11.7, and NaOH content of less than 5.0% in the waste. The mixed-oxidant gas is preferably produced by a gas generator comprising an electrolytic cell having an anode compartment, a bipolar electrode in the anode compartment, a cathode compartment and a membrane separating the compartments to permit only a limited flow of electrolyte therebetween. When a low salt concentration solution is electrolyzed in this cell, the output is a mixed oxidant gas containing chlorine and various oxygen-containing species. The gas generator which is preferred is that shown in U.S. Pat. No. 4,248,681. The oxidant gas produced from dilute salt solutions contains chlorine, chlorine dioxide and other oxygen-containing gases. In alkaline solution, the mixed oxidant gases form a mixture of salts of the formula $NaClO_x$, where x is 1–7. After a reaction time from several hours up to several days, the product obtained can be washed with water to substantially remove chemically combined lignins, while a fraction of the hollo-cellulose has been substantially hydrolyzed to sugars, and is a satisfactory feed for ruminant animals, being non-toxic and digestible.

20 Claims, 4 Drawing Sheets

CONVERSION OF CELLULOSIC AGRICULTURAL WASTES

BACKGROUND OF THE INVENTION

1. Field of the Invention

This invention relates to new and useful improvements for conversion of cellulosic wastes into a form which is more edible and digestible by ruminant animals.

2. Brief Description of the Prior Art

Crop residues, i.e., cellulosic wastes, such as cotton gin trash, straw, corn stalks and husks, cotton wastes, peanut shells, saw dust, etc., offer a tremendous feed resource for ruminant animals. For each pound to corn, wheat, milo, etc., produced there is left a cellulosic residue of about one pound. A small amount of these residues are used as animal feed, e.g., by grazing of fields after harvesting the grain.

These cellulosic wastes, such as cotton gin trash, straw, corn stalks and husks, cotton wastes, peanut shells, saw dust, etc., are highly lignified cellulose structures which are digested poorly, if at all, by ruminants. For example, cotton gin trash is only digested about 36%-44% by ruminants as compared to 55-60% for conventional forage such as alfalfa and 80-90% for grains. Some of these ligno-cellulosic wastes, e.g., cotton gin trash, are useful only for their thermal value from burning and have a zero or negative economic value.

It has been known for forty years that the lignin in cellulosic wastes is responsible for the low digestibility. Recently, work at the University of Illinois, University of Nebraska and Texas Tech University has shown that the lignin in cellulosic wastes can be broken down by treatment with alkaline hydrogen peroxide to produce a cellulosic residue which is 55-75% digestible. The problem in utilization of this treatment has been one of logistics as well as the additional expense of the hydrogen peroxide in the quantities required.

The cellulosic wastes derived from agricultural practices are readily available on the farm, or at cotton gins in the case of gin trash, but these materials are bulky and expensive to transport. It is therefore uneconomical to move the dispersed cellulosic wastes to chemical processing facilities. The only practical way, at present, to treat these wastes would involve treatment and consumption of the treated materials on the farm. Central processing might be practical, however, in the case of cotton gin trash, because of the large quantities collected at central locations. The economics of the alkaline hydrogen peroxide treatment is another matter. Even in the quantities used, hydrogen peroxide is expensive and the cost of treatment makes the entire process of treatment economically doubtful. The development of a cheap process for manufacture of hydrogen peroxide at the point of use on the farm might overcome these economic constraints.

The following references are relevant to the production of oxidizers and their use in chemically treating agricultural wastes. R. Norris Shreve, "Chemical Process Industries" 3rd Ed., McGraw-Hill, New York, N.Y. pp. 222-259, (1967); "Kirk Othmer, Encyclopedia of Chemical Technology" 3rd Ed. vol X5, 580-611, Interscience Publishers, New York, N.Y. (1968); Wendell Latymer, "Oxidation Potentials" Prentice Hall, New York, N.Y. (1952); Michael Andon "Oxygen" W. A. Benjamim, New York, N.Y. (1965); C. R. Wilke, et. al., "Enzymatic Hydrolysis of Cellulose, Theory and Application" pp. 41-61, Noyes Data Corporation Park Ridge, N.J. (1983); and David A. Tillman and Edwin C. John "Progress in Biomass Conversion" Volume 4, Academic Press, New York, N.Y. (1983).

Charles T. Sweeney, U.S. patent application Ser. No. 328,278, filed Mar. 24, 1989, has recently conducted and sponsored research into the use of various mixed oxidant gases in the conversion of cellulosic wastes which offers the prospect of overcoming both the reagent cost and logistical problems encountered in the preparation of ruminant feeds. This research has involved the utilization of various mixed oxidant gases produced by various electrolytic cells.

Chlorine generators based on the use of electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed Ion-permeable membranes used in electrolytic cells have ranged from asbestos diaphragms to carboxylate resin polymers to perfluorosulfonic acid polymer membranes. The perfluorosulfonic acid membranes were developed by Dupont for use in electrolytic cells. Anion exchange membranes, of polymers having anion functionality, are made by Ionics Inc. of Watertown, Mass.

Dotson U.S. Pat. No. 3,793,163 discloses the use of Dupont perfluorosulfonic acid (NAFION) membranes in electrolytic cells and makes reference to U.S. Pat. Nos. 2,636,851; 3,017,338; 3,560,568; 3,496,077; 2,967,807; 3,282,875 and British Patent 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085, Westerlund U.S. Pat. No. 4,069,128 and Sweeney U.S. Pat. No. 4,804,449.

Discussion of perfluorosulfonic acid (NAFION) membranes is also discussed in the technical literature, e.g., Dupont Magazine, May-June 1973, pages 22-25 and a paper entitled "Perfluorinated Ion Exchange Membrane" by Grot, Munn and Walmsley, presented to the 141st National Meeting of the Electro-Chemical Society, Houston, Tex., May 7-11, 1972.

The structure of electrodes used in electrolytic cells is set forth in most of the patents listed above. Additionally, the following U. S. Patents disclose configurations of anodes or cathodes used in electrolytic cells.

Giacopelli U.S. Pat. No. 3,375,184 discloses an electrolytic cell with controllable multiple electrodes which are flat plates of wedgeshaped configuration. Ettel U.S. Pat. No. 3,821,097 uses flat plates in electroplating cells. Lohrberg U.S. Pat. No. 3,951,767 discloses the use of flat plate electrolytic anodes having groove along the bottoms thereof for conducting gas bubbles generated in the electrolytic process. Andreoli U.S. Pat. No.

565,953 discloses electroplating apparatus having a plurality of metal screens which are not connected in the electric circuit and function to plate out the metal being separated by the electrolysis.

In "The chlorine dioxide content of chlorine obtained by electrolysis of salt", Electrochemical Technology 5, 56–58 (1967) Western and Hoogland report that chlorine dioxide is not produced in the electrolysis of salt in the absence of chlorates.

Sweeney U.S. Pat. No. 4,256,552 discloses an electrolytic generator for production of chlorine, for chlorination of swimming pools, water systems, etc., in which a bipolar electrode is positioned in the anode compartment between the anode and the cation-exchange membrane in the wall separating the compartments. Sweeney U.S. Pat. No. 4,334,968 discloses improvements on the cell or generator of U.S. Pat. No. 4,256,552 and discloses the production of chlorine dioxide in the cell. Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions. Sweeney U.S. Pat. No. 4,308,117 discloses a cell having three compartments, with the anode and cathode in the outer compartments and the bipolar electrode in the central compartment. A cation-exchange membrane is positioned in the wall between the central compartment and the cathode compartment, while an anion-exchange membrane is positioned in the wall between the central compartment and the anode compartment. Sweeney U.S. Pat. No. 4,324,635 discloses a cell having an anode compartment, a cathode compartment, and a separating wall with a cathode-exchange membrane therein. The cell includes a pump circulating some of the cathode compartment solution to the anode compartment for pH control. The gases produced by these cells have come to be referred to as mixed oxidant gases which contain chlorine, oxides of chlorine, oxygen as ozone, peroxides, and other oxygen species.

In subsequent studies, it has been found that cells of the type shown in U.S. Pat. Nos. 4,256,552, 4,334,968 and 4,248,681 can be operated with very low salt concentrations and, under such conditions, produce oxidizing gases containing very small amounts of chlorine or chlorine compounds. Sweeney U.S. Pat. No. 4,804,449 discloses the use of nonionic membranes of Kanecaron in place of Nafion in electrolytic cells for production of mixed oxidant gases. Kanecaron fibers are of a modacrylic composition of acrylic polymeric structure having 35–85% wt. acrylonitrile units. Kanecaron fibers used in these cells are modacrylic fibers of this general type composed of 50% acrylonitrile and 50% vinyl chloride fibers.

SUMMARY OF THE INVENTION

One object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals.

Another object is to provide a new and improved method for the treatment of ligno-cellulosic wastes, e.g., cotton gin trash, straw, corn stalks and husks, cotton wastes, peanut shells, saw dust, etc., by spraying with an alkaline solution of oxygen, ozone, peroxides and other oxygen species to produce a pH of 11.4–11.7 and water content of less than 20% in the cellulosic wastes and allowing reaction to convert them to a form significantly more edible and digestible by ruminant animals.

Another object is to provide a new and improved method for the treatment of cellulosic wastes, e.g., straw, corn stalks and husks, cotton wastes, peanut shells, saw dust, etc., by spraying with an alkaline solution of a mixed oxidant gas containing chlorine, oxides of chlorine, oxygen and other oxygen species, produced by a membrane-type electrolytic cell, to produce a pH of 11.4–11.7 and total water content of less than 20% in the cellulosic wastes and allowing reaction to convert them to a form more edible and digestible by ruminant animals.

Another object is to provide a new and improved method for the treatment of cellulosic wastes, e.g., straw, corn stalks and husks, cotton wastes, peanut shells, saw dust, etc., by spraying with an alkaline solution of a mixed oxidant gas containing chlorine, oxides of chlorine, oxygen and other oxygen species, produced by a membrane-type electrolytic cell having an anode, a cathode, and an additional electrode positioned between the anode and cathode and maintained at a lower potential than the anode relative to the cathode, to produce a pH of 11.4–11.7 and total water content of less than 20% in the ligno-cellulosic wastes and allowing reaction to convert them to a nontoxic form more edible and digestible by ruminant animals Other objects will be apparent from time to time throughout the specification and claims as hereinafter related.

These objects and other objects of the invention are accomplished by a novel method for conversion of comminuted cellulosic agricultural wastes into a form edible by ruminant animals comprises treating such wastes, e.g., straw, corn stalks and husks, cotton wastes, peanut shells, saw dust, etc. by spraying with an aqueous solution of a mixed oxidant gas, at a pH of about 11–12, to produce a total water content of less than 20%, a pH of about 11.4–11.7, and total NaOH content of less than 5.0% in the waste. The mixed-oxidant gas is preferably produced by a gas generator comprising an electrolytic cell having an anode compartment, a bipolar electrode in the anode compartment, a cathode compartment and a membrane separating the compartments to permit only a limited flow of electrolyte therebetween When a low salt concentration solution is electrolyzed in this cell, the output is a mixed oxidant gas containing chlorine and various oxygen-containing species The gas generator which is preferred is that shown in U.S. Pat. No. 4,248,681. The oxidant gas produced from dilute salt solutions contains chlorine, chlorine dioxide and other oxygen-containing gases. In alkaline solution, the mixed oxidant gases form a mixture of salts of the general formula $NaClO_x$, and $NaO_x$ where x is 1–7. After a reaction time from several hours up to several days, the product obtained can be washed with water to substantially remove chemically combined lignins, while a fraction of the hollocellulose has been substantially hydrolyzed to sugars, and is a satisfactory feed for ruminant animals

DESCRIPTION OF PREFERRED EMBODIMENTS OF THIS PROCESS

In a preferred method for conversion of comminuted ligno-cellulosic agricultural wastes into a form edible by ruminant animals the wastes, e.g., straw, corn stalks and husks, cotton wastes, peanut shells, saw dust, etc. are sprayed with an aqueous solution of a mixed oxidant gas containing chlorine and various oxygen-containing species, at a pH of about 11-12, to produce a total water content of less than 20%, a pH of about 11.4-11.7, and NaOH content of less than 5% in the waste.

Figure 1:
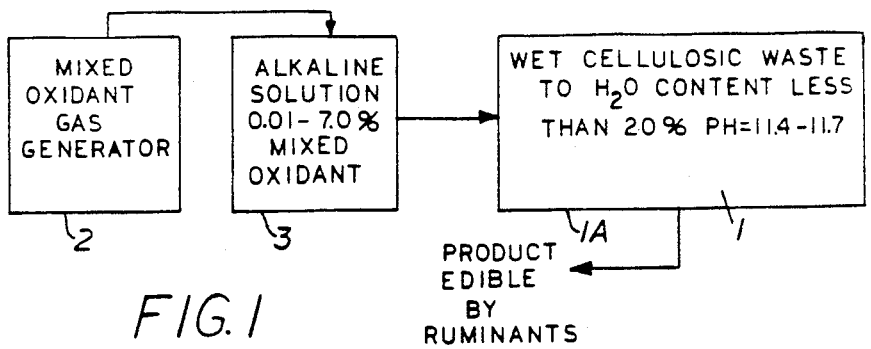
FIG. 1 is a schematic view of a method or system for treatment of cellulosic wastes in accordance with a preferred embodiment of this invention to produce a product edible by ruminants.

A schematic view of this method or system is shown in FIG. 1 of the drawings wherein a supply of ligno-cellulosic wastes e.g., straw, corn stalks and husks, cotton wastes, peanut shells, saw dust, etc., is comminuted to a relatively small size and introduced into storage zone 1a. A mixed oxidant generator 2, i.e., electrolytic cell, produces an oxidant gas mixture which is introduced into an absorber 3 where it is dissolved in water with appropriate adjustment of pH to an alkaline condition to produce a mixed oxidant solution of 0.01-7.0% as a pH of 7.5-12.0 consisting of a mixture of salts of the formula $NaClO_x$, where x is 1-7. The mixed-oxidant gas is a mixture of chlorine, oxides of chlorine, and various oxygen species, such as oxygen, hydrogen peroxide, ozone, etc., preferably produced by a gas generator 2 comprising an electrolytic cell having an anode compartment, bipolar electrodes in the anode compartment, a cathode compartment and a membrane separating the compartments to permit only a limited flow of electrolyte therebetween When a low salt concentration solution is electrolyzed in this cell, the output is a mixed oxidant gas containing chlorine and various oxygen-containing species. The gas generator is preferably that shown in U.S. Pat. No. 4,248,681 where the oxidant gas produced from dilute salt solutions contains chlorine, and various oxygen-containing gases. Specific preferred embodiments of the mixed-oxidant gas generator cells 2 are shown in FIGS. 2-15, below.

The solution from absorber 3 is mixed with concentrated aqueous NaOH and the mixture may be diluted with water to the desired alkalinity and is sprayed on the comminuted cellulosic wastes in storage bin or zone 1a to produce a total water content of less than 20%, and pH of 11.4-11.7, NaOH content less than 5%, on the wastes. After a storage time of several hours or more, the ligno-cellulosic wastes are converted to a delignified condition with an appreciable conversion of hollocellulose to sugars. The product now is digestible to an extent in excess of 55% by ruminant animals.

MIXED OXIDANT GAS GENERATORS

The description of FIGS. 2-15, below, is essentially a repetition of the description in Sweeney U.S. Pat. No. 4,248,681, and analogous or equivalent generators, but is repeated here to avoid referring to an external document in describing the present invention. This invention comprises a method for the treatment of cellulosic wastes using the mixed oxidant gases produced by the apparatus of Sweeney U.S. Pat. No. 4,248,681, and analogous or equivalent generators, when operated under certain selected conditions. It is therefore deemed appropriate to repeat the description of the Sweeney apparatus and operating procedure to provide a setting for the present invention.

Figure 2:
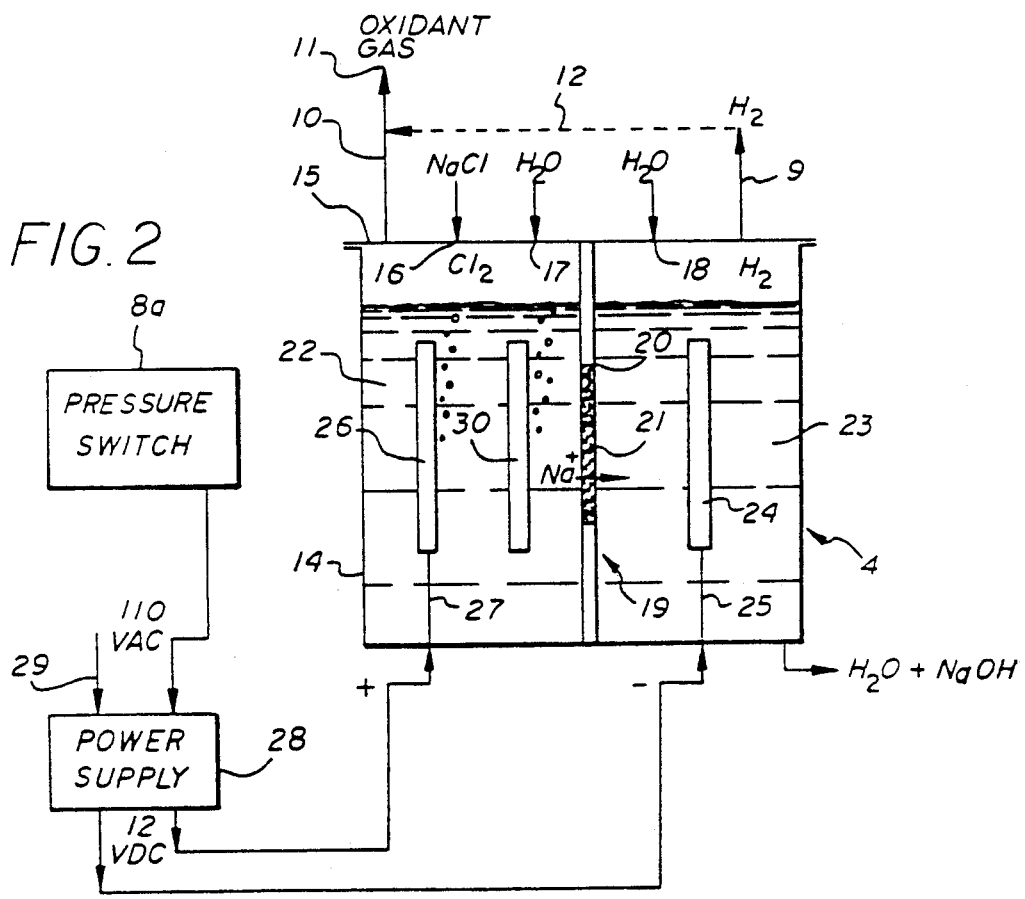
FIG. 2 is a schematic view, in elevation, of a preferred embodiment of the electrolytic generator, of the type shown in U.S. Pat. No. 4,248,681, to be used in the method or system shown in FIG. 1.

In FIG. 2, electrolytic generator 4 consists of a hollow container 14 having a removable cover 15 sealed in place having an opening 16 for introduction of a chloride salt (sodium chloride), and openings 17 and 18 for introduction of water. Hollow container 14 is divided by a vertically extending wall 19 which has a window opening 20 in which there is positioned ion-permeable membrane 21 which conducts cations, e.g. sodium ions, preferably of the type conventionally used in electrolytic cells provided with membrane separation of the anode and the cathode compartments. The preferred membranes are fluorinated polymers, e.g. perfluorosulfonic acid polymers, such as NAFION Registered Trademark, manufactured by Dupont or a nonionic KANECARON fiber membrane.

Wall member 19 including membrane 21 divides the interior of container 14 into an anode compartment 22 and a cathode compartment 23. A cathode 24 is positioned in cathode compartment 23 and connected by electric lead 25 to a point external to container 14. Anode 26 is positioned in anode compartment 22 and is connected by electric lead 27 to a point external to container 14. The apparatus is provided with a power supply, such as a transformer 28 powered by 110 volt power source 29 and providing a 12 volt D.C. output connected to electric leads 25 and 27. An electrically neutral (bipolar) electrode 30 is positioned in anode compartment 22. The bipolar electrodes may be positioned anywhere in the anode compartment, e.g., in front of, to the side of, or behind the anode relative to the cathode 24 and membrane 21. In this embodiment, however, the bipolar electrodes 30 are positioned in a direct line between anode 26 and cathode 24 and adjacent to ion-permeable membrane 21. Electrode 30 is electrically neutral (bipolar) in the sense that it is not connected by lead wire to the electric circuit energizing the anode 26 and cathode 24 to effect electrolytic decomposition of a salt solution.

Figure 3:
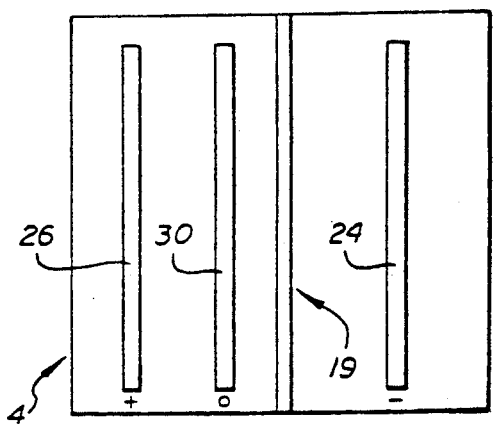
FIG. 3 is a plan view of the electrolytic generator shown in FIG. 2.

In FIG. 3, which is a plan view of the mixed oxidant gas generator 4, the plate-like construction of the various electrodes 24, 26, and 30 is seen. It has been found experimentally that better yields are obtained by increasing the effective area of the anode. Thus, flat-plate electrodes are preferred in the oxidant gas generator of this invention, although in some applications, the cylindrical electrodes or other shape may be used. The cathode 24 is preferably a flat-plate of steel or the like. The anode 26 and the electrically neutral (bipolar) electrode 30 are preferably flat plates of carbon.

OPERATION

The electrolytic generator described and shown in FIGS. 2 and 3 has been tested and found to be a substantial improvement over more conventional electrolytic chlorine generators and under certain conditions produce novel oxidant gas compositions.

In the electrolytic generator shown, the cell is charged with water in both the anode compartment 22 and the cathode compartment 23 to a level above the top of the various electrodes but leaving a sufficient space at the top for the collection of gases. Common table salt (sodium chloride) was added to the water in the anode compartment. In carrying out this process, any soluble chloride salt may be used, e.g. sodium chloride, potassium chloride, lithium chloride, rubidium chloride, cesium chloride, ammonium chloride, magnesium chloride, etc., although for economic reasons sodium chloride is preferred. The ion-permeable membrane 21 in the cell was Dupont NAFION, although nonionic KANECARON membrane may be used. Neutral (bipolar) electrode 30 was placed approximately one inch from the membrane. 12 volt D.C. were applied an monitored by a D.C. ammeter in the circuit.

The system was turned on. The current flow was 0.250 A; voltage readings of the solution were nearly constant throughout the anode compartment. This indicated that the anode compartment represented a single uniform resistance relative to the cathode. A potential difference between the anode and the neutral (bipolar) electrode was 0.9 V.D.C. There was immediate, visible generation of hydrogen at the cathode. At this current level, there is a substantial lag in the production of gases in the anode compartment. After a short period of time, however, gas begins to form at both the anode 26 and the neutral (bipolar) electrode 30.

The gas produced at the anode 26 and the neutral (bipolar) electrode 30 was unexpectedly found to consist of a mixture of chlorine and chlorine dioxide when a high concentration of salt is used. The proportions of operation and in some cases the chlorine dioxide is present in a substantial excess over the chlorine. When the current is increased to about 10-11 A. for full production, there is vigorous generation of the gas mixture at anode 26 and neutral (bipolar) electrode 30. When operating at full voltage and full current, there is a substantial and measurable potential measured across the three electrodes in the cell. The neutral (bipolar) electrode 30 is at a potential of about 8 V. relative to the cathode. The potential in the brine between the neutral (bipolar) electrode 30 and anode 26 is about 10 V. Anode 26 is at a potential of 12 V. relative to cathode 24.

Under the conditions of operation described above, there is vigorous generation of hydrogen at cathode 24 and a rapid production of sodium hydroxide in cathode compartment 23. Sodium hydroxide is the natural product obtained when the sodium ions passing through ion-permeable membrane 21 are neutralized at cathode 24. The resulting product is sodium metal which is almost instantly converted into sodium hydroxide with evolution of hydrogen. At the same time, there is vigorous generation of the gas mixture in the anode compartment 22 at both the neutral (bipolar) electrode 30 and the anode 26. The evolution of gas commences almost immediately compared to a relatively long induction period for production of chlorine in conventional electrolytic chlorine generators.

In the start up of a chlorine generator, there is usually a substantial induction, or lag time which results from the low conductivity in the cathode compartment. Usually, the operation of the cell is relatively slow until sufficient sodium ions have been converted into sodium hydroxide at the cathode 24 and the caustic solution has reached a sufficient level of concentration to be highly electrically conductive. Likewise, in the anode compartment, there is usually an induction, or lag time resulting from the solubility of chlorine in water, particularly when the chlorine is generated slowly.

In this improved electrolytic generator there is a more rapid build up of sodium hydroxide in the cathode compartment as a result of the short distance that the sodium ions must travel from the neutral (bipolar) electrode 30 to pass through ion-permeable membrane 21. Also, in this generator, the generation of the gas mixture at anode 26 and neutral (bipolar) electrode 30 is so vigorous that there is an almost immediate generation of gas from the cell. The productivity of this cell was initially evaluated using the DPD colorimetric method of measuring residual chlorine in water. Data showed that, at worst cell 1 lb. of chlorine-containing gas per day was easily obtained at a current of 11 A. and only 5 gal. of brine solution. There was no long loss of time for start up and waiting for solutions to be concentrated with salt or caustic levels to rise. In conventional electrolytic chlorine generators the lag time in start up has often been days.

In later experiments, the production of gas in the anode compartment seemed to be greater than theoretical. It was then that chlorine dioxide was discovered as a significant component of the gas produced. The anode compartment gas was collected and bubbled through an absorber for chlorine and the residue analyzed for chlorine dioxide content. The chlorine dioxide was found to be the major constituent of the gas produced in the anode compartment at both the anode 26 and the neutral (bipolar) electrode 30.

In experimental work carried out with this electrolytic generator cell, a number of important observations were made. The resistance of the anode compartment is directly related to the distance of the anode to the cathode and the saturation of salt in the electrolytic solution The production of the gas mixture at the anode and the neutral (bipolar) electrode and the production of hydrogen at the cathode are directly related to the surface area of these electrodes and the current density. With a greater area of anode surface and neutral (bipolar) electrode surface and a higher current, more gas production occurs. The current flow however is limited by the resistance of the solution in the anode compartment and the rate of flow of sodium ions through ion-permeable membrane 21. The rate of flow of sodium ions through the membrane is also directly related to the caustic level of sodium hydroxide in the solution in cathode compartment 23 and is also related to the area of ion permeable membrane 21. At higher operating pressures, the cell produces a greater amount of chlorine oxides, while at low pressures, the output comprises greater amounts of oxygen species By placing neutral (bipolar) electrode 30 in the cell and locating the electrode in line between cathode 24 and anode 26 adjacent to ion-permeable membrane 21, substantial advantages are obtained. Neutral (bipolar) electrode 30 acts as an anode relative to cathode 24 and also acts as a cathode relative to anode 26. In this manner, neutral (bipolar) electrode 30 assists in effecting a rapid transfer of sodium ions to cathode compartment 23 and improves the rate of build up of caustic in that compartment. It also functions to improve the chlorine/chlorine dioxide output and to reduce the induction period or start up time for the cell.

Tests carried out with this equipment using $6'' \times 12''$ cathode, $6'' \times 12'' \times 2''$ anode, $6'' \times 12'' \times 2''$ neutral (bipolar) electrode and $2\frac{1}{2}'' \times 8''$ ion-permeable membrane has shown that once the cell is saturated with salt a high chlorine/chlorine dioxide output can be maintained with a small membrane area being used efficiently. The optimum size for the ion-permeable membrane 21 is probably an area not substantially greater than the area required to conduct the maximum current used in the chlorine/chlorine dioxide generator cell. The cathode 24, anode 26 and neutral (bipolar) electrode 30 are preferably about the same surface area. Some difference in surface are may be used in certain specialized applications as will be described in connection with certain of the alternate embodiments of this invention.

The removal of chlorine/chlorine dioxide mixture and hydrogen and of caustic solution from the chlorine generator cell 4 is shown schematically, as is the introduction of water and table salt to the generator. Specific construction involves conventional structure in electrolytic cells and in gas recovery from such cells. The collection of hydrogen and of the chlorine/chlorine dioxide mixture may involve simple gas collection apparatus and may, if desired, involve the use of systems for mixing the hydrogen and chlorine/chlorine dioxide gas mixture with water for introduction into a body of water as described in connection with FIG. 1 above.

Also, the equipment can be used in association with timers or in connection with flow controlling switches or controls or in connection with pressure responsive switches and controls as is well known in the prior art.

When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased. In carrying out the treatment of ligno-cellulosic wastes according to the present invention, the operation of the cell under conditions which emphasize the production of chlorine dioxide and ozone are preferred.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1.

ALTERNATE EMBODIMENTS OF THE APPARATUS

In FIGS. 4 to 15 there are shown a number of alternate embodiments of the oxidant gas generator shown in FIGS. 2 and 3. In these views, the oxidant gas generator is shown in plan view as in FIG. 3 and is illustrated in a variety of forms using different arrangements of neutral (bipolar) electrodes and/or different configurations of electrodes.

Figure 4:
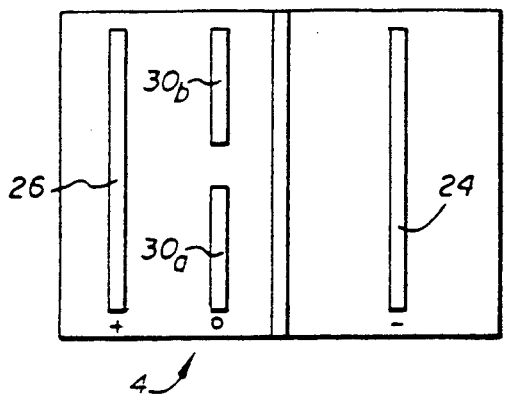
FIG. 4 is a plan view of another embodiment of electrolytic generator, for use in the method or system shown in FIG. 1, having a plurality of neutral (bipolar) electrodes.

In FIG. 4, the oxidant gas generator 4 has anode 26 and cathode 24 as in FIGS. 2 and 3. Neutral (bipolar) electrode 30, however, is provided as two separate electrodes 30a and 30b. When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, production of ozone is increased.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1.

Figure 5:
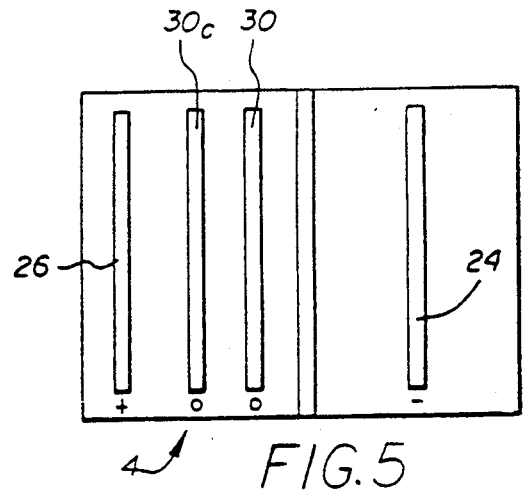
FIG. 5 is a plan view of another embodiment of electrolytic generator, for use in the method or system shown in FIG. 1, having a plurality of neutral (bipolar) electrodes aligned in series.

In FIG. 5, oxidant gas generator 4 has cathode 24 and anode 26 as in FIGS. 2 and 3. In this embodiment, neutral (bipolar) electrode 30 is positioned adjacent to the ion-permeable membrane and a second neutral (bipolar) electrode 30c is positioned between the electrode 30 and anode 26. When the circuit is energized, oxidant gas production occurs at anode 26 and at each of the neutral (bipolar) electrodes 30 and 30c. When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1.

Figure 6:
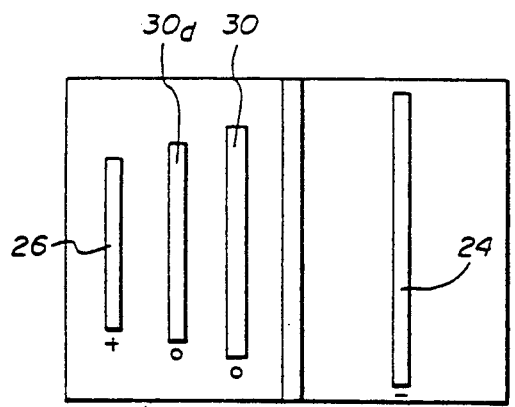
FIG. 6 is a plan view of still another embodiment of electrolytic generator, for use in the method or system shown in FIG. 1, having a plurality of neutral (bipolar) electrodes and an anode of diminishing size.

In FIG. 6, oxidant gas generator 4 has an anode 26 which is appreciably smaller in area than cathode 24. Neutral (bipolar) electrodes 30 and 30$d$ are graduated in size between the large size or cathode 24 and the small size or cathode 26. When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1

Figure 7:
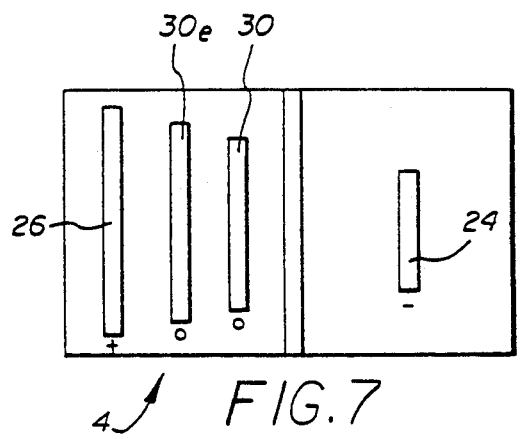
FIG. 7 is a plan view of still another embodiment of electrolytic generator, for use in the method or system shown in FIG. 1, having a plurality of neutral electrodes and an anode of increasing size.

In FIG. 7, oxidant gas generator 4 has a cathode 24 of relatively small size and anode 26 of substantially larger size Neutral (bipolar) electrodes 30 and 30 e are graduated in size. When the cell is operated with low salt concentrations, i.e. just sufficient to maintain electrical conductivity, the production of chlorine virtually disappears, and the product gases predominate in oxygen and ozone, with some production of hydrogen peroxide in the liquid phases When air, or pure oxygen, is circulated through the anode compartment during the electrolysis, the production of ozone is increased.

Figure 8:
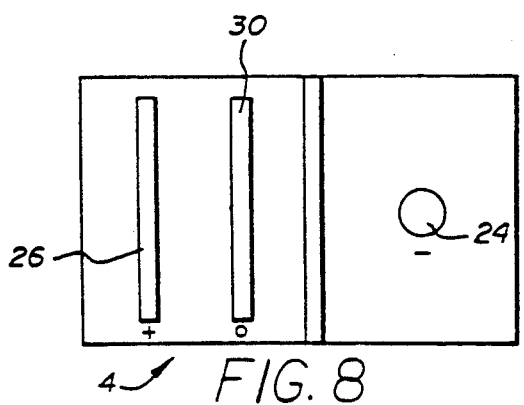
FIG. 8 is a plan view of still another embodiment of electrolytic generator, for use in the method or system shown in FIG. 1, having a cylindrical cathode and flat plate electrodes and an anode.

In FIG. 8, oxidant gas generator 4 is substantially the same as that shown in FIG. 3, except that cathode 24 is a cylindrical rod.

Figure 9:
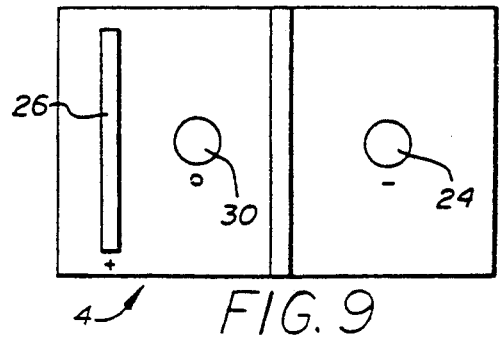
FIG. 9 is a plan view of still another embodiment of electrolytic generator, for use in the method or system shown in FIG. 1, in which the cathode and the neutral (bipolar) electrode are cylindrical.

In FIG. 9, oxidant gas generator 4 has a cylindrical cathode 24 a flat plate anode 26 and cylindrical rod neutral (bipolar) electrode 30.

Figure 10:
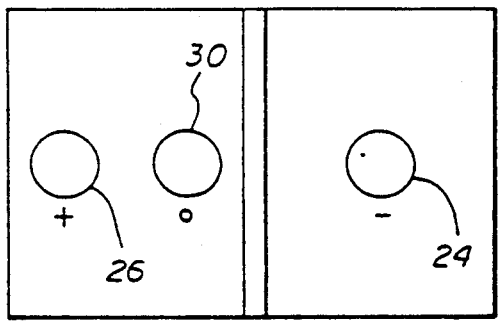
FIG. 10 is a plan view of still another embodiment of electrolytic generator, for use in the method or system shown in FIG. 1, in which the cathode, anode and neutral (bipolar) electrode are all cylindrical in shape.

In FIG. 10, oxidant gas generator 4 has cathode 24, anode 26 and neutral (bipolar) electrode 30 all in the form of cylindrical rods. In each of these cases, the cylindrical rod cathode is of a metal such as stainless steel and the anode 26 and neutral (bipolar) electrode 30 are preferably of carbon either in the form of a flat-plate or cylindrical rod as shown.

In the several embodiments having multiple neutral (bipolar) electrodes 30, viz. FIG. 4, FIG. 5, FIG. 6, and FIG. 7, the oxidant gas generation takes place at the anode 26 and at each of the separate neutral (bipolar) electrodes. A plurality of neutral (bipolar) electrodes, two or more, may be used as desired. Oxidant gas generation takes place at each of the electrodes and the anode. In the embodiment shown in FIG. 6 the current flow is focused from a large cathode 24 through sequentially smaller neutral (bipolar) electrodes 30 and 30$d$ to a smaller anode 26 to provide a higher current density. The reverse effect is obtained in FIG. 9 where the graduated neutral (bipolar) electrodes and 30 and 30$e$ focus a high current from a small cathode 26 on to a larger anode 26. The embodiments in FIGS. 8, 9, and 10 illustrate the effect of substitution of cylindrical electrodes in the oxidant gas generator cell.

Figure 11:
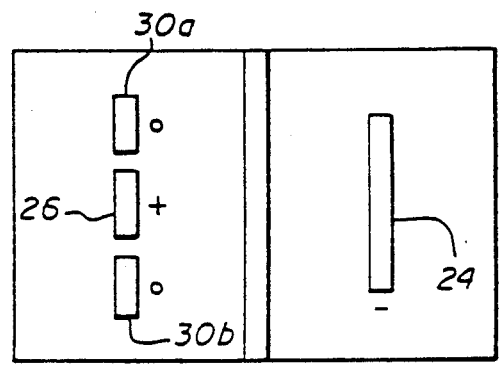
FIG. 11 is a schematic plan view of another embodiment of electrolytic generator, for use in the method or system shown in FIG. 1, in which the neutral (bipolar) electrodes are positioned adjacent to the anode.

In FIG. 11, there is shown another embodiment of the invention in which the neutral (bipolar) electrodes 30$a$ and 30$b$ are located adjacent to anode 26 and aligned therewith. In this embodiment, the neutral (bipolar) electrodes are spaced at the same distance from the cathode 24 as anode 26 rather than being in line between the anode and cathode. The neutral (bipolar) electrodes are preferably spaced closely to each side of anode 26 but not in physical contact therewith. When this embodiment is filled with saturated aqueous chloride salt, as in the other embodiments, and energized, the gas evolved at anode 26 contains 1.5 parts chlorine dioxide per part chlorine.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1.

Figure 12:
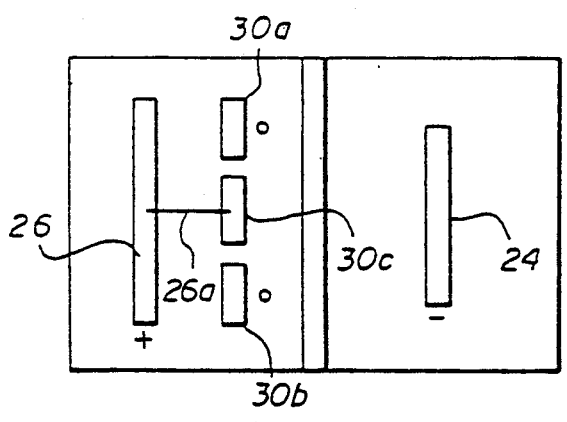
FIG. 12 is a schematic plan view of another embodiment of electrolytic generator, for use in the method or system shown in FIG. 1, in which a plurality of neutral (bipolar) electrodes are positioned side-by-side between the anode and cathode.

In FIG. 12, there is shown still another embodiment of the invention in which a plurality of electrodes 30$a$, 30$b$ and 30$c$ are positioned side-by-side between anode 26 and cathode 24. Electrodes 30$a$, 30$b$ and 30$c$ are also considered to be positioned in parallel in an electrical sense since they represent parallel paths for current flow between anode 26 and cathode 24. The central electrode 30$c$ is connected by lead 26$a$ to anode 26 and is thus maintained at the same potential as anode 26, less any voltage drop through the lead, relative to cathode 24. When this embodiment is energized, the output from electrode 30$c$ is pure chlorine dioxide while the output from anode 26 is a mixture of chlorine and chlorine dioxide.

Figure 13:
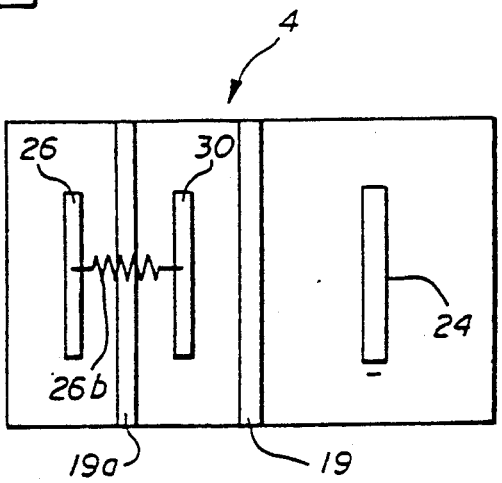
FIG. 13 is a schematic plan view of another embodiment of electrolytic generator, for use in the method or system shown in FIG. 1, in which the neutral (bipolar) element is separated from the anode and cathode compartment by ion-permeable membranes.

In FIG. 13, there is shown an embodiment of the invention in which electrode 30 is isolated from both the cathode 24 and anode 26 by separators 19 and 19$a$, respectively. Anode 26 is connected by a resistor 26$a$ to electrode 30 to maintain the same at a lower potential than the anode relative to cathode 24. When this embodiment is energized, the output from electrode 30 is pure chlorine while the output from anode 26 is a mixture of a major amount of chlorine dioxide and a minor amount of chlorine. When the same cell is operated with resistor 26$a$ and omitting divider 19$a$, the voltage drop through the resistor maintains the electrode 30 at a lower potential than anode 26 relative to cathode 24 and produces an enhanced mixed oxidant gas. A structure equivalent to this embodiment is produced by having electrode 30 directly to anode 26 but having an coating which results in a voltage drop. Likewise, an external connection between electrode 30 and anode 26 producing a voltage drop gives the same effect.

The mixed oxidant gas from this cell is absorbed in aqueous alkaline solution The solubility increases with increase in pH of the solution. Mixed oxidant gas solutions have concentrations of 0.01–7.0% as the pH increases from about 7.5 up to about 12.0. These solutions are used in the method shown in FIG. 1.

Figure 14:
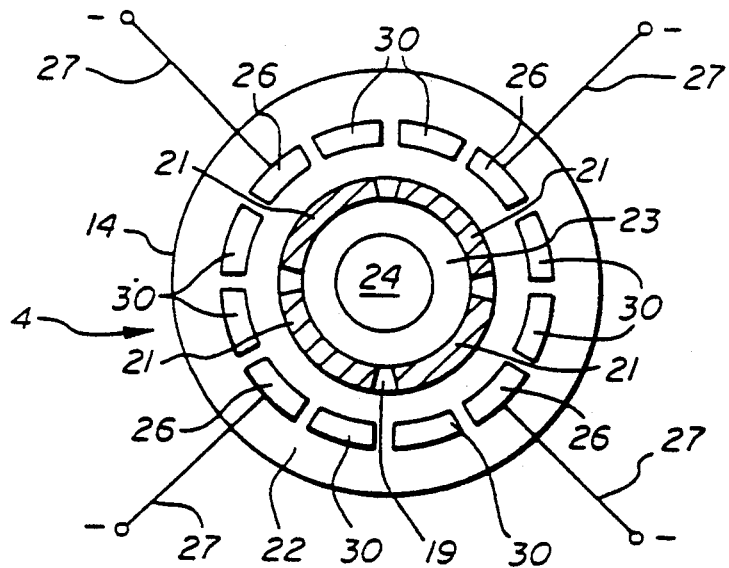
FIG. 14 is a schematic view of a cylindrical electrolytic generator for use in the method or system shown in FIG. 1.

In FIG. 14, there is shown a further embodiment in which electrolytic generator 4 is housed in a cylindrical container 14. Separator wall 19 is cylindrical and divides the generator into anode compartment 22 and cathode compartment 23. Separator wall 19 includes a plurality of ion-permeable membranes 21. Cathode 24 is positioned in compartment 23 and is connected to the D.C. power source. A plurality of anodes 26 are spaced around anode compartment 22. A plurality of neutral (bipolar) electrodes 30 are positioned between anodes 26. Anodes 26 are connected to a common lead or connection to the power source. When energized, this generator produces hydrogen from compartment 23 and chlorine dioxide and a small amount of chlorine from compartment 22.

The mixed oxidant gas from this cell is absorbed in aqueous alkaline solution. The solubility increases with increase in pH of the solution. Mixed oxidant gas solutions have concentrations of 0.01-7.0% as the pH increases from about 7.5 up to about 12.0. These solutions are used in the method shown in FIG. 1.

Figure 15:
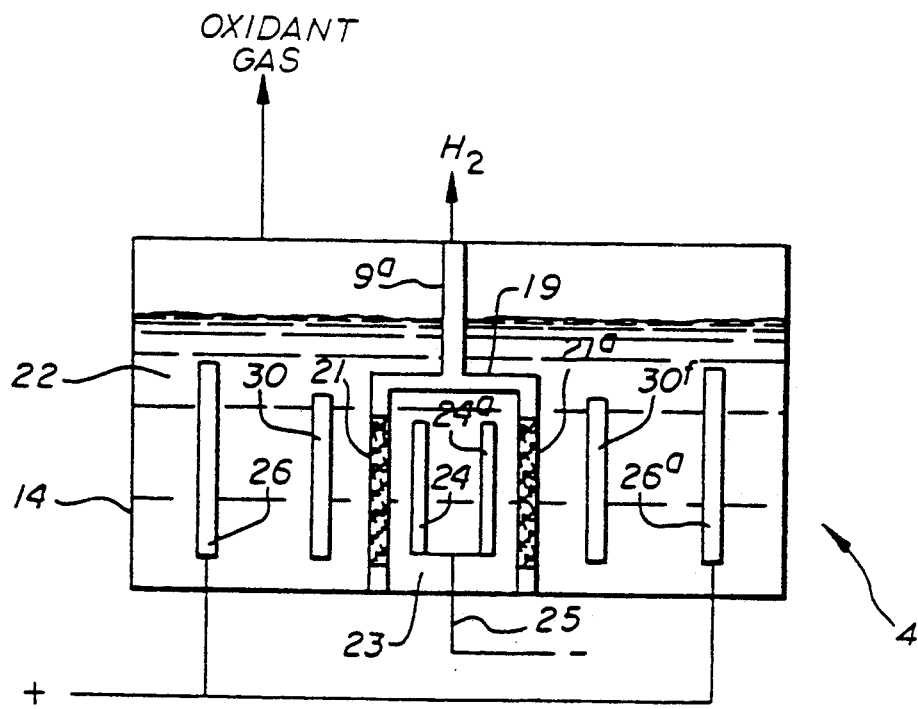
FIG. 15 is a schematic view, in elevation, of still another embodiment of electrolytic generator, for use in the method or system shown in FIG. 1, having a pair of cathodes and a pair of anodes.

In FIG. 15, there is shown still a further embodiment of the invention in the form of a double cell. Chlorine-chlorine dioxide generator 4 consists of hollow container 14 having wall 19 completely enclosing the cathode chamber 23. A pair of ion-permeable membranes 21 and 21a are positioned on opposite sides of wall 19. A pair of cathodes 24 and 24a are provided in cathode compartment 23 and are connected to the electric circuit by lead 25. A conduit 9a leads from the end wall portion of wall 19 to conduct hydrogen from cathode compartment 23.

Anode compartment 22 completely surrounds wall 19 and the liquid level completely covers cathode chamber 23. A pair of anodes 26 and 26a are provided. A pair of neutral (bipolar) electrodes 30 and 30f are provided and positioned in direct line between the respective cathodes and anodes, and adjacent to the ion-permeable membrane. Chlorine is produced from each of the anodes 26 and 26a and the neutral (bipolar) electrodes 30 and 30f and hydrogen and caustic are produced in cathode chamber cell is the same as the other embodiments, except that the number of electrodes is doubled.

The mixed oxidant gas is absorbed in aqueous alkaline solution. The solubility increases with increase in pH of the solution. Mixed oxidant gas solutions have concentrations of 0.01-7.0% as the pH increases from about 7.5 up to about 12.0. These solutions are used in the method shown in FIG. 1.

CHARACTERIZATION OF ALKALINE MIXED OXIDES SOLUTIONS

The apparatus of FIG. 2 was used in the generation of mixed oxide gases and in the preparation of alkaline solutions used in the subsequent treatment of ligno-cellulosic wastes. As described above, the electrolytic unit used has a proprietary diaphragm for separation of the anode and cathode chambers and multiple, bipolar configurations of the electrodes to enhance the electrochemical reactions. Gaseous components generated within the anode chamber are withdrawn as a gaseous mixture of air and entrained in a caustic solution. Entrainment is accomplished by recirculating the caustic solution through an aspirator which exerts a slight negative pressure on the anode chamber. The reagents produced by the electrolytic process in the anode chamber are predominately chlorooxy acids in aqueous solutions. Hence their vapor phase constituents, which are swept from the anode chamber, are neutralized by contact with the caustic solution at the aspirator and become stabilized as dissolved salts.

While neutralization and stabilization greatly reduce the oxidizing potential of many of the oxidizing species generated in the anode chamber, it enhances the activity of others. A number of experiments were undertaken to identify the active species. The experimental evidence suggests that the major active ingredients are sodium salts of $ClO_x$. While x=1 predominates, others values of x up to six and seven are possible. Other active ingredients appears to be salts of the Oxion. These latter compounds are not nearly as stable in caustic solutions as are the $ClO_x$ salts, and they certainly are more difficult to monitor on an analytical basis. In both cases, however, the salt complexes can be destabilized by acid conditions (pH reduction) and ultraviolet light.

Stabilization of these oxidizing salts in caustic aqueous solution is important to the cellulosic wastes pretreatment process It allows for some limited storage of the reagent and imparts flexibility to the chemical pretreatment process More importantly, however, the stabilized salts appear to increase the utilization of cellulose as an energy source for ruminant animals. It is not yet clear how this stimulus is achieved in the ruminant, but our in vitro tests have shown effective in creases in digestibility at levels of concentration of the reagent as low as 500 ppm. At these low levels the improvement in digestibility of gin byproduct waste can be accomplished at a comparatively low cost for the electrolytically generated reagent. It is this low cost, (less than $1.00/ton of gin wastes) coupled with enhanced performance in cellulose utilization, which is critical to the commercialization of the chemical pretreatment technology.

GENERATION OF REAGENT

The electrolytic unit used was a bench scale, ten (10) amp unit. It was placed in a laboratory hood as a precaution against the build up hydrogen or other potentially hazardous gases in the work area. This particular unit used graphite rods as bipolar electrodes. This is the system of apparatus of FIG. 11, which has been shown to deliver mixed oxidants of the same composition as that of FIG. 2.

Feed stocks to the unit included tap water ($H_2O$) and salt pellets (NaCl). Water was added to both the anodic and cathodic chambers Salt was added only to the anode chamber through a PVC pipe which had slots or perforations in its wall. This arrangement allowed water in the anode chamber to flow freely into the pipe and dissolve the salt. As a consequence, a rather concentrated brine solution was maintained in the anode chamber.

Because the membrane barrier between the anode and cathode chambers is ion selective, the anode chamber retains a high level of sodium and chlorine ions throughout the operation. However the positive sodium and hydrogen ions tend to migrate under the influence of the electrical gradient towards the cathode chamber. There they combine with electrons to produce atomic hydrogen and sodium. The hydrogen is evolved as molecular hydrogen at the cathode ($H_2$), while the metallic sodium reacts with water to produce more hydrogen and hydroxyl ions, ($OH^-$). The hydroxyl ions are then attracted to the anode chamber by the electrical gradient. This sets up a counter diffusion of ions within the electrolytic cell; i.e. sodium and hydrogen ions traveling one way, hydroxyl and chlorine ions the other.

Reactions at the anode and bipolar elements within the anode chamber are much more complex than those of the cathode. As noted, the majority of the negative ions attracted to the anode are either chlorine ($Cl^+$ or hydroxyl ($OH^-$). The chlorine ions can give up electrons to form molecular chlorine gas ($Cl_2(g)$) which can either escape the chamber or react with water within the chamber to produce HCl and HOCl. Both of these reaction products exert vapor pressures and are also to be found in the gases withdrawn from the anode chamber.

The hydroxyl ion, in the absence of the chloride ion, is known to produce atomic and ultimately elemental oxygen ($O_2(g)$) as the anode reaction, (i.e. the electrolysis of water, produces hydrogen and oxygen). However, ozone ($O_3$) and peroxides ($H_2O_2$) are also minor constituents generated during anode reactions in an electrolytic cell. The latter compounds have been shown to be enhanced by catalytic surface effects and low pH levels for the anode chamber liquid. Their aggressiveness as oxidizers is also highly disproportionate to their low levels of concentration.

The fact that both chlorine and oxygen first form as atomic species due to electron transfer from the anode reaction can give rise to $ClO_x$ types of compounds. The lower values of X represent compounds which are both reactive with water and exert vapor pressures. Hence, a number of different acid gases can be generated. These gases have sufficient stability to allow them to be drawn into the aspirator where they are neutralized and complexed by the caustic solution Gases produced in the cathode chamber (vented under positive pressure) include H and $H_2$ (predominates). Gases produced in the anode chamber (aspirated under negative pressures) include Anode: Cl, $Cl_2$, $O_2$, O, $O_3$, $ClO_2$, ClO, $H_2O_2$, HCl, and HOCl. Predominate anode chamber species are $Cl_2$, $ClO_2$, ClOH, OClOH, $H_2O_2$, and $O_3$.

The large number of different molecular species generated by anode reactions and as the result of chemical reactions with water and/or saline solution in the anode chamber makes a thermodynamic analysis of this electrolytic process extremely complex. It is further complicated by the fact that the system being studied is only quasi steady state. Hence, a thermodynamic study which considers only equilibrium conditions may not be completely indicative of the actual experimental process.

While a thermodynamic study of the electrolytic cell could help elucidate its potential performance, the procedure used to complex the gases prior to cellulosic wastes contacting also simplifies the analysis of the overall effect produced by the process. In these experiments, a solution of 0.4 to 0.5% by weight of sodium hydroxide in water was circulated continuously from a six gallon reservoir through the aspirator. The low pressure inlet of the aspirator was then connected through a plastic tube (2 ft) to the head space of the anode chamber. Ambient air was drawn into the head space by the reduced pressure and used to sweep the head space gases into the aspirator.

The 0.4 to 0.5% hydroxide solution gave an initial pH reading of the solution in excess of 11.0. In general, this pH remained constant during the early portions of operation (4 hrs) and then began to show a gradual decrease. This behavior is indicative of a neutralization reaction and the formation of salts. If a salt of a strong acid-strong base is formed, i.e. NaCl, then the salt solution which is formed should reach a neutral pH of 7.0. A salt of a weak acid and strong base, e.g., NaClO, however, will continue to exhibit a pH>7.0. In this investigation, the observed pH was in excess of 8.0 when the process was terminated, and was never observed to be on the acid side of neutral, i.e. pH<7.0.

This behavior, with an initial high pH>11.0 followed by a progressive reduction to a pH>8.0, would be typical of the formation of $NaClO_x$ salts. Certainly the massive production of only chlorine ($Cl_2$) over time would lead first to a neutral salt (NaCl) solution with a pH of 7.0. This would then be followed by a gradual excursion to a low pH (acid) brine. Similarly, it has been well established that ozone, $O_3$, and hydrogen peroxide, $H_2O_2$, are very short lived in caustic (high pH) solutions. This means that sodium salts of $ClO_x$ and $O_x$ ions are probably the only major ingredients of the caustic aqueous reagent which were produced by the electrolytic unit during these experiments and remain as active oxidizers. In cases where x is small for the $ClO_x$ compounds, i.e. x=1 or 2, the anion is a weak acid and, hence, the salt of the strong base sodium hydroxide should give a pH greater than 7.0; this was observed In addition to monitoring pH, the oxidizing potential of the solution circulating through the aspirator was periodically measured. These measurements employed a well established potassium iodide (KI) standard method. This procedure is frequently used to determine the level of ozone ($O_3$) dissolved in water. However, the(KI) method is nonspecific. It is sensitive to all oxidizing moieties dissolved in the aqueous solution i.e., $H_2O_2$, $ClO_2$, HClO etc. Therefore, the use of the (KI) analytical procedure gave an indication of the total level of oxidation potential for the solution This potential is reported as an equivalent, hypothetical ozone concentration. For example, it is well established that ozone is short lived in aqueous solutions which are caustic. However, the basic liquid reagent generated during operation of the electrolytic cell gave an equivalent $O_3$ concentration of 1500 ppm when the pH of the solution was greater than 10. Hence, it was concluded that the major ingredient of the reagent solution progressively became sodium salts of $ClO_x$ ions. The following chemical mechanisms are offered as additional evidence for support of this conclusion.

Hypothesis: Ozone dissolved in water breaks down to produce molecular oxygen. The KI analytical procedure is sensitive to this breakup due to the presence of atomic oxygen as an intermediate. $O_3 \rightarrow 3O$ or $O_3 \rightarrow O_2 + O$, where O represents atomic, nascent oxygen or the oxygen radical detected by the KI. Hence, one mole of $O_3$ will be stoichiometrically equivalent to one mole of O. Now assume that sodium hypochlorite is the major salt formed in the liquid reagent. NaOH (aq)+HOCl(aq)$\rightarrow$NaOCl(aq)+$H_2O$(l) and then NaOCl (aq)$\rightarrow$Na(aq)+Cl(aq)+O.

Hence, each mole of sodium hypochlorite, like each mole of ozone, has the potential to release a mole of reactive O. In the synthesis of the liquid reagent, a 0.4 to 0.5 weight percent solution of sodium hydroxide in water was used. This is equivalent to 5 grams of NaOH per liter of solution or 0.125 moles of NaOH per liter of solution. If each mole of caustic (NaOH) produces one mole of sodium hypochlorite salt, then a complete neutralization reaction would produce 0.125 moles per liter of sodium hypochlorite solution.

It was just shown that each mole of sodium hypochlorite can generate one mole or sixteen grams of reactive oxygen.

Hence, the liquid reagent with a total of 0.125 moles per liter of NaOCl would reflect a potential oxidizer concentration of 2 grams/liter or 2000 ppm of ozone equivalence. However, the liquid reagent generated for treatment of the gin wastes to be used in the in vivo studies was produced from a 0.4% caustic solution. This level of initial caustic translates into a maximum of 1600 ppm of ozone equivalence. The actual analytical measurements by the KI method gave ozone equivalence levels in the range of 1500 to 1600 ppm. This agreement appears to support observation that $ClO_x$ salts provide the majority of the oxidizing potential of the generated reagent.

Based on these observations a second series of in vitro digestibility tests were conducted. In this second approach, synthetic solutions were made from water and various pure, but individual, $NaClO_x$ salt reagents. Only the pure sodium hypochlorite solution gave in vitro digestibilities approaching those of the electrolytically derived reagent. Salts for which x was greater than 2 gave diminishing or erratic results There is one final indication that $ClO_x$ salts are the major ingredient of the liquid reagent. This indicator was drawn from the observation that the ash content of the treated gin wastes increased over and above that of the untreated materials. The increase went beyond what might be expected from the addition of the NaOH (0.4%) to the base reagent. Only the presence of the stable, salt forming chloride ion accounts for this increasing level of ash. The $O_x$ salts are not stable enough to withstand the thermal effects of the ashing process. Hence the preponderance of the experimental evidence suggests that for the liquid reagent generated for use in the feed trials, the active ingredients are sodium salts of $ClO_x$.

Large Scale Production of Reagent

As mentioned earlier, a six gallon recirculation tank was used to prepare the liquid reagent for laboratory tests. Since as much as thirty (30) gallons of this reagent were needed for the larger scale in vivo tests, this necessitated the use of larger storage tanks. It was observed that with an electrolytic unit setting of ten amps (full scale), the six gallon container would reach a oxidant level of 1500-1600 ppm in approximately twenty four hours. Hence, two, thirty gallon tanks were filled from the smaller six gallon tank over a period of two weeks. The reagent in these larger tanks was then taken to the Texas Tech University Agriculture Farm for mixing with the gin cellulosic wastes.

The only other large scale production of the reagent occurred in a commercial field test at Spring Lake, Tex. In this instance, two larger (50 amp) electrolytic units were used in parallel, and the circulating caustic solution was stored in two 250 gallon plastic tanks. Since measurements of ozone equivalence could not be made at regular intervals on this system, it was not possible to perform a definitive comparison of the 10 amp versus the 50 amp units. However, a linear approximation would suggest that a maximum time span of six days would be needed to bring each 400 gallon tank up to the 1500-1600 ppm range. Based on the limited observation time made available, this appeared to be the case. On this basis, 1.0 kilowatt hour of energy will produce 0.031b of $NaClO_x$ oxidizer equivalent ozone. If electrical power costs are $0.06 per kilowatt hour, then the approximate reagent cost would be $2.00/lb oxidizer. This cost translates to less than $1.00 per ton of treated gin wastes.

Reagent Cost Considerations

The electrolytic production of $ClO_x$ salts at $2.00 per pound of oxidizer does not initially appear to be a cost effective approach for generating a chemical reagent for cellulosic wastes pretreatment. Caustic (NaOH), which has been used to treat cellulosic wastes, sells for $0.28 per pound (FOB) in bulk. Ozone, a stronger oxidant than $ClO_x$, has also been used to treat biomass, and it can be produced for reportedly as little as $0.50 per pound. However, with ozone, destructive decomposition occurs much more rapidly than it does with the $ClO_x$, and hence there is a significant loss in overall effectiveness. The same is true of the hydrogen peroxide based reagents, although they are much more stable than ozone.

How then can the $ClO_x$ salts at $2.00 per pound compete? The answer appears to be two fold; (1) very little of the $ClO_x$ reagent is required, and (2) its stability outside the rumen allows it to effectively increase the digestibility one it reaches the rumen. These characteristics will be highlighted in more detail in the feed trial reports. However, in order to provide guidelines for the development of a commercial product or process, a quick cost comparison between a caustic pretreatment and the $ClO_x$ pretreatment will be attempted. Other processes which use ozone or caustic hydrogen peroxide have already been shown to be less cost effective than those which use only caustic; even though the improvements in the digestibility of the cellulosic wastes have been shown to be quite acceptable by all the processes.

Research studies have shown that the digestibility of gin wastes increases in direct proportion to the amount of (NaOH) caustic which is added. However, the ruminant system can effectively tolerate concentrations of only 5% by weight or less of NaOH in the diet. The following calculations take this into account along with an imposed limitation on moisture content; not to exceed twenty percent for the treated cellulosic wastes. This latter constraint is intended to avoid problems with premature spoilage due to biological growths at the higher moisture levels. It is further assumed that both the caustic and the $ClO_x$ oxidizer will be sprayed as aqueous solutions. Thus processing costs for the two approaches will be the same, and only reagent costs need be considered.

Basis: 1.0 ton of gin waste is processed through a tub grinder and screened to remove dirt and grit. This raw material has 10% moisture, <10% Ash, and >30% OMD. Treatment: Thirty gallons of 1500 ppm oxidizer solution is sprayed on each ton of gin waste with mixing to provide a uniform contacting and distribution of moisture. This treated material has <20% moisture, <15% Ash, and >50% OMD. Note: Uniform distribution is important. Moisture content and ash may exceed these limits by 2.0 percentage points. The OMD levels can not fall below the 50% level for any random sample based on a 96 hour in vitro digestibility test.

Basis: 1.0 ton of raw gin waste ready for treatment: 10% $H_2O$, 10% Ash, 80% Organic Matter. The $ClO_x$ solution assays at 1500 ppm oxidizer, and costs $2.00/lb. Caustic costs $0.28/lb. The finished product is less than 5% NaOH and 20% by weight of water. The cost is $1.00/ton of raw gin waste; or $1.25/ton of organic matter; or $0.90/ton of finished product.

These calculations, based on experimental work, indicate at least a twenty fold reduction in reagent costs for pretreatment of cellulosic wastes by the $ClO_x$ reagent. In essence this implies that the chemical reagent is a minor cost consideration in the preparation of gin wastes as an alternative roughage similar to alfalfa for ruminant diets. Hence, for a start to finish operation which uses gin supplied cellulosic wastes, the cost factors of transportation, processing (grinding & screening), maintenance, and labor are all more significant factors than reagent costs.

TREATMENT OF CELLULOSIC WASTES

A number of experiments were carried out for treating various cellulosic wastes with $NaClO_x$ solutions produced as described above. The treated waste was first tested for improved digestibility of the cellulosic wastes. It was then used to demonstrate the actual use of the treated product in feeding animals.

EXAMPLE 1

Control

As a control, a quantity of chopped wheat straw (0.25-0.50" pieces) was treated to improve digestibility by a procedure under investigation at a number of universities. The wheat straw was treated by spraying with 50% aqueous alkali (NaOH) to yield a pH of 11.4-11.7 on the straw (about 5% NaOH on the straw). The alkaline treated straw was then treated with 18% aqueous alkaline hydrogen peroxide until the water content of the straw was about 35%. The treatment was carried out at 55° C.

The straw had an initial composition of about 66% dry matter and was about 38% digestible by ruminants (cattle) prior to treatment. The dry matter was 86% organic, about 56% cellulose and lignin.

After allowing the chopped straw to set for several hours to react, the product was evaluated by subjecting it to contact with the stomach digestive juices of the ruminant and the amount digested determined by weight loss. The product obtained in this manner had a digestibility of 79.7%. The several hours reaction time as used in this and successive examples refers to a time from about five hours up to several days depending upon whether the digestibility tests were run in the local laboratory or shipped to one of the universities for evaluation in their testing program.

The use of 18% aqueous alkaline hydrogen peroxide in this procedure is quite expensive and has made the process economically unsound. When attempts were made to reduce the amount of hydrogen peroxide substantially, the digestibility of the product dropped off drastically. For example, using a 4% aqueous alkaline hydrogen peroxide, under the same general procedure, results in a product with a digestibility of about 50%. If the hydrogen peroxide concentration is reduced to 1%, the digestibility is hardly improved at all over the untreated straw. Similar results are obtained using other cellulosic wastes, such as chopped cotton gin trash, corn stalks and husks, peanut shells, saw dust, etc.

EXAMPLE 2

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.7% mixed oxidants (7000 ppm.) in the form of $NaClO_x$ salts, where $x = 1-7$. Sufficient solution was sprayed on dry chopped wheat straw to produce a pH of 11.5 on the straw and a water content of 35%.

After allowing the chopped straw to set for several hours to react, the product was evaluated by subjecting it to contact with the stomach digestive juices of the ruminant and the amount digested determined by weight loss. The product obtained in this manner had a digestibility of about 57%. Product produced by treatment of an equivalent amount of alkaline hydrogen peroxide has a digestibility of about 40%.

EXAMPLE 3

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.37% mixed oxidants (3700 ppm.) in the form of $NaClO_x$ salts, where $x = 1-7$. 40 ml. mixed oxidant solution were mixed with 40 ml. of 50% aqueous NaOH and then diluted with 200 ml water. Sufficient solution was sprayed on dry chopped wheat straw to produce a pH of 11.6 on the straw and a water content of 35% after mixing for one minute.

After allowing the chopped straw to set for several hours to react, the product was evaluated by subjecting it to contact with the stomach digestive juices of the ruminant and the amount digested determined by weight loss. The product obtained in this manner had a digestibility of about 62%. Product produced by treatment of an equivalent amount of alkaline hydrogen peroxide has a digestibility of about 40%. Additional runs were made where the amounts of 50% NaOH solution mixed with the 40 ml. of 0.37% mixed oxidant solution were reduced to 10 ml. and 5 ml., respectively. The digestibility of the respective products were 38% and 27%.

EXAMPLE 4

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.88% mixed oxidants (8800 ppm.) in the form of $NaClO_x$ salts, where $x = 1-17$. 200 ml. mixed oxidant solution were mixed with 120 ml. of 50% aqueous NaOH. Sufficient solution was sprayed on dry chopped wheat straw to produce a pH of 11.6 on the straw and a water content of 35% after mixing for ten minutes.

After allowing the chopped straw to set for several hours to react, the product was evaluated by subjecting it to contact with the stomach digestive juices of the ruminant and the amount digested determined by weight loss. Product obtained in this manner had a digestibility of more than 80%. Product produced by treatment of an equivalent amount of alkaline hydrogen peroxide has a digestibility of about 40%.

EXAMPLE 5

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a series of solutions containing from 0.014% mixed oxidants (140 ppm.) up to 6.7% mixed oxidants (67,000 ppm.) in the form of $NaClO_x$ salts, where $x = 1-7$. 200 ml of the respective mixed oxidant solutions were mixed with 120 ml. of 50% aqueous NaOH. Sufficient solution was sprayed on dry chopped wheat straw to produce a pH of 11.6 on the straw and a water content of 35%. after mixing for ten minutes.

After allowing the chopped straw to set for several hours to react, the products were evaluated by subjection to contact with the stomach digestive juices of the ruminant and the amount digested determined by weight loss. The results are tabulated in Table I below:

TABLE I

Effects of Oxidant Concentration

| Run No. | pH | Oxidant Concentration | % Digestibility |
|---|---|---|---|
| A-1 | 11.6 | 140 ppm. | 47 |
| A-2 | 11.6 | 700 ppm. | 42 |
| A-3 | 11.6 | 3,800 ppm. | 46 |
| A-4 | 11.6 | 6,500 ppm. | 40 |
| A-5* | 11.6 | 140 ppm. | 70 |
| A-6 | 11.6 | 21,000 ppm. | 44 |
| A-7 | 11.6 | 30,000 ppm. | 48 |
| A-7a | 11.8 | 30,000 ppm. | 54 |
| A-7b | 12.0 | 30,000 ppm. | 58 |
| A-8 | 11.6 | 42,000 ppm. | 50 |
| A-9 | 11.6 | 67,000 ppm. | 55 |

*sample had low organic content

In the conversion of the cellulosic wastes to a more digestible form, there is a release of lignin as an acid form which lowers the pH of the product considerably, and accompanied by conversion of at least some of the cellulose to sugars.

EXAMPLE 6

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce solutions containing 0.88% mixed oxidants (8800 ppm.), 2.1% mixed oxidants (21,000 ppm.) and 6.7% mixed oxidants (67,000 ppm.) respectively in the form of $NaClO_x$ salts, where $x=1-7$. 200 ml. of each of the various mixed oxidant solutions were mixed with 120 ml. of 50% aqueous NaOH. Sufficient solution was sprayed on dry chopped wheat straw to produce a pH of 11.6 on the straw and a water content of 35%. after mixing for ten minutes.

After allowing the chopped straw to set for several hours to react, the products were evaluated by subjection to contact with the stomach digestive juices of the ruminant and the amount digested determined by weight loss. The results are tabulated in Table II below:

TABLE II

Effects of Oxidant Concentration

| Run No. | pH | Oxidant Concentration | % Digestibility |
|---|---|---|---|
| 1 | 11.6 | 8800 ppm. | 66 |
| 2 | 11.4 | 8800 ppm. | 72 |
| 3 | 11.4 | 8800 ppm. | 63 |
| 4 | 11.4 | 21,000 ppm. | 61 |
| 5 | 11.6 | 67,000 ppm. | 55 |

In the conversion of the cellulosic wastes to a more digestible form, there is a release of lignin as an acid form which lowers the pH of the product considerably, and accompanied by conversion of at least some of the cellulose to sugars.

EXAMPLE 7

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.88% mixed oxidants (8800 ppm.) in the form of $NaClO_x$ salts, where $x=1-7$. 200 ml. mixed oxidant solution were mixed with 120 ml. of 50% aqueous NaOH. Sufficient solution was sprayed on dry chopped gin trash (cotton bolls, stems, etc.) to produce a pH of 11.9 (which is lowered rapidly as lignin is released) and a water content of 35% in the gin trash and mixed for one minute.

After allowing the chopped gin trash to set for several hours to react, the product was evaluated by subjecting it to contact with the stomach digestive juices of the ruminant and the amount digested determined by weight loss. The product obtained in this manner had a digestibility of about 67%. The digestibility of an untreated control is about 36%. Product produced by treatment of an equivalent amount of alkaline hydrogen peroxide has a digestibility of about 37%.

EXAMPLE 8

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.88% mixed oxidants (8800 ppm.) in the form of $NaClO_x$ salts, where $x=1-7$. 200 ml. mixed oxidant solution were mixed with 120 ml. of 50% aqueous NaOH. Sufficient solution was sprayed on dry chopped gin trash (cotton bolls, stems, etc.) to produce a pH of 11.4 and a water content of 35% in the gin trash and mixed for five minutes.

After allowing the chopped gin trash to set for several hours to react, the product was evaluated by subjecting it to contact with the stomach digestive juices of the ruminant and the amount digested determined by weight loss. The product obtained in this manner had a digestibility of about 64%. The digestibility of an untreated control is about 36%. Product produced by treatment of an equivalent amount of alkaline hydrogen peroxide has a digestibility of about 37%.

EXAMPLE 9

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 2.0% mixed oxidants (20,000 ppm.) in the form of $NaClO_x$ salts, where $x=1-7$. 200 ml. mixed oxidant solution were mixed with 120 ml. of 50% aqueous NaOH. Sufficient solution was sprayed on dry chopped gin trash (cotton bolls, stems, etc.) to produce a pH of 11.6 and a water content of 35% in the gin trash and mixed for ten minutes.

After allowing the gin trash straw to set for several hours to react, the product was evaluated by subjecting it to contact with the stomach digestive juices of the ruminant and the amount digested determined by weight loss. The product obtained in this manner had a digestibility of about 46.5%. The digestibility of an untreated control is about 36%. Product produced by treatment of an equivalent amount of alkaline hydrogen peroxide has a digestibility of about 39%.

EXAMPLE 10

Mixed Oxidant Solution Treatment

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 6.7% mixed oxidants (67,000 ppm.) in the form of $NaClO_x$ salts, where $x=1-7$. 200 ml. mixed oxidant solution were mixed with 120 ml. of 50% aqueous NaOH. Sufficient solution was sprayed on dry chopped gin trash (cotton bolls, stems, etc.) to produce a pH of 11.6 and a water content of 35% in the gin trash after mixing for five minutes.

After allowing the chopped gin trash to set for several hours to react, the product was evaluated by subjecting it to contact with the stomach digestive juices of the ruminant and the amount digested determined by weight loss. The product obtained in this manner had a digestibility of about 46%. The digestibility of an untreated control is about 36%. Product produced by treatment of an equivalent amount of alkaline hydrogen peroxide has a digestibility of about 39%.

EXAMPLE 11

Mixed Oxidant Solution Treatment of Whole Grains

A series of experiments were carried out to evaluate the possible improvement in digestibility of whole grains by treatment with the mixed oxides solutions to convert the indigestible cellulosic portions of the grains.

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.15% mixed oxidants (1,500 ppm.) in the form of $NaClO_x$ salts, where $x=1-7$.

Whole kernel corn and whole kernel grain sorghum were treated with water until 7% water was absorbed as controls. Whole kernel corn and whole kernel grain sorghum were treated with the above described solution to an uptake of 7% by weight. Grains were frozen (for storage purposes only) after treatment.

Corn, with 7% water absorption, had a digestibility of 59.3%. Corn, with 7% MO solution absorption, had a digestibility of 68.6%, an improvement of 16%.

Grain sorghum, with 7% water absorption, had a digestibility of 56.7%. Grain sorghum, with 7% MO solution absorption, had a digestibility of 68.0%, an improvement of 20%.

The improvement in whole grains is attributable to the conversion of the cellulosic shell of the grain which is relatively indigestible. To the extent that the cellulosic shell of the grain is relatively indigestible, it can be considered a cellulosic waste for the purposes of this invention, subject to improvement in digestibility by the treatment of this invention.

CAUSTIC-MIXED OXIDIZER TREATMENT OF GIN-BYPRODUCT WASTE ANIMAL FEEDING STUDIES

Gin byproduct waste was chemically treated with a proprietary solution of mixed oxidizers containing a mixture of salts of the formula $NaClO_x$. The gin waste was first rough-ground in a tub grinder; which is standard practice in the preparation of this material as a roughage ingredient for ruminant animal diets. Approximately one ton of this roughground material was then sequentially treated with solutions of caustic (50% NaOH) and the caustic-mixed oxidizer. The only imposed constraints were that the amount of caustic could not exceed five percent (5%) of the dry matter (DM) of the gin waste, and that the total moisture level could not exceed twenty percent (20%) of the mass of the DM of the raw gin waste.

This chemical pretreatment process yielded a thirty-eight percent (38%) increase in the in-vitro organic matter digestibility (OMD) of the gin waste. The untreated waste had an average OMD of 39% while the treated material averaged 53%. However, the ash content of the treated material doubled from 11% for the raw waste to 24% for the treated material. Much of this additional ash is water soluble. (65% to 75%)

In other exploratory experiments, some of the rough-ground gin wastes were further reduced to a more uniform sized product; i.e., ground and screened to pass a sixteen mesh screen. From this classified material, fifty gram (50 g) samples were withdrawn and treated with various amounts of water, caustic, and mixed oxidizer solutions. The percent water levels ranged from 9.5% for the control, or raw gin waste, up to 60% for some treatments. The amount of caustic added ranged from 0% to 40% (NaOH) based on the DM in the raw waste. (The raw waste, or control, had an average assay of 90.5% DM). The amounts of mixed oxidizer, which was measured as ozone equivalence (02 eq.), ranged from 0.0 mg/g DM up to 1.8 mg/gDM. (i.e. two parts per thousand)

All three variables, water, caustic, and mixed oxidizer, were found to enhance in vitro organic matter digestibility (OMD). However, the mixed oxidizer produced the most dramatic increases. Water appears to play an important roll in the expansion and softening of any ligno-cellulose structure. For this study water use was limited only by the storage requirements of the treated product. Treated gin wastes with moisture levels greater than 15% tend to spoil in storage due to the increased availability of raw sugars for microbial activity. Hence, the drying costs needed to reduce moisture levels to 15% or less and thereby prevent spoilage can be a significant fraction of processing costs, if the initial moisture levels are too high.

Although increased levels in concentrations of caustic can produce corresponding increases in in vitro OMD by solubilizing hemi-cellulose and crude lignin fractions, its use in invivo applications is limited to levels which are less than 5% of the available dry matter. Even at this low level, however, the caustic appears to greatly increase the ash content of the processed material, particularly in conjunction with the use of the mixed oxidizers. For these reasons the use of caustic, except at levels below 0.5% to help stabilize the mixed oxidizer solution, is not recommended.

The mixed oxidizer solution, in association with water at sufficient levels to expand the biomass, appears to have the most dramatic effect on increasing the OMD of the raw gin wastes. In this study the mixed oxidizers were stabilized in high pH (pH>9) caustic solutions. Chemically, the mixed oxidizer solution appears to consist of sodium salts of perchlorates and hypochlorites. Peroxides and hypo oxides may also be present, but for these latter compounds the half life in the high pH solutions is known to be extremely short. Only the halogenated oxides are sufficiently stable to maintain a long term persistence. Moreover, in the quantitative determination of the oxidizer's concentration, when measured as ozone equivalents by the KI method, it was observed that the release of the oxidizer was uncharacteristically slow at ambient temperature. Lab measurements indicated that storage of the stabilized mixed oxidizer solution for periods of at least two weeks are possible without loss of oxidation effectiveness.

CAUSTIC MIXED OXIDIZER TREATMENT OF GIN-BYPRODUCT WASTE GENERAL PROCEDURES: MIXING PROCESS

The general mixing procedure in this instance is summarized below:

A. Samples of GBW were weighed (50 gram) and placed in polyethylene bags.

B. The desired NaOH level was established based on a 90.5% DM level of the raw material. The required NaOH was then added as an aqueous solution of 50% NaOH.

C. The desired moisture level was then set based again on a 90.5% DM level in the raw GBW. Water which enters with the raw GBW (i.e. 9.5%) and water associated with the caustic solution was taken into account. The required water to make up the difference was then added. If the mixed oxidizer solution was to be added, it was assumed to be all water.

D. When the water or mixed oxidizer solution was added, the moistened mixture was manually kneaded in the plastic bag for at least ten minutes. With mixed oxidizer solutions a slight exotherm may be felt during this stage of the process.

E. The treated GBW still in the plastic bag was identified and placed under refrigerated conditions until assayed for pH, DM, ash, OM, DMD and OMD.

The assay procedures performed on these laboratory samples or grab samples from the larger (2000 lb) batch were standard procedures, and will not be discussed in detail. As indicated above, the data of interest include: pH, dry matter (DM), ash, organic matter (OM), dry matter digestibility (DMD) and organic matter digestibility (OMD). All but pH are usually recorded as percentages, and the last, (OMD) is assumed to be an indication of the energy available to the ruminant animal from the biomass.

The pH was measured with a standard pH meter to two decimal points. For solid GBW materials, a small grab sample of one or two grams was placed in 100 ml of distilled water agitated with a magnetic stirrer. The pH of the solution was then obtained. Insertion of the pH probe directly into the moist biomass can be attempted, but may or may not provide consistent readings.

The mixed oxidizer solution (MO) was assayed for total oxidizing species by the standard KI (potassium iodide) procedure. This technique was developed to detect $O_3$ dissolved in aqueous solutions, but is sensitive to all oxidizing species. Herein, we refer to the oxidizer concentration as being ozone equivalents, ($O_3$ eq.) since the actual oxidizing compounds are not fully known at present and undoubtedly represents a mixture of several oxidizing species of the formula $NaClO_x$, where $x=1-7$. The MO solution used in this study had an average bulk concentration of 1200 ppm, $O_3$ eq. This concentration in the high pH solution is reasonably stable over periods of several weeks which is indicative of sodium halogenate dioxides.

An excess of twenty different experiments were performed in a random fashion. Moisture levels were selected to coincide (approximately) with the 20%, 40%, and 60% isoplots. The lower 20% level of moisture is above the equilibrium 9.5% moisture level of the control and may represent the upper level for which post drying is not required. The 60% moisture level is the lower limit for ensilage practices and would definitely need drying if it is to be stored in any way other than as silage. Although caustic concentrations were limited to 5% for animal studies (in vivo), excursions as high as 40% caustic additions were attempted. These were done in order to check earlier organic digestibility data which appeared to by atypically elevated. These data also have implications for non animal uses of cellulose recovery from biomass.

In general, the level of mixed oxidizer solution (MO) was limited by the 1200 ppm of the feed stock and by the amount of total moisture used in the treatment process. Even so, the two parts per thousand level, which was the maximum used, appeared to be quite adequate. There could well be an upper concentration level above which the micro flora in the ruminant is adversely affected by the presence of mixed oxidizer. However, this level has yet to be established, and additional experimentation with progressively higher MO concentrations is needed.

The data given in Table 3 reflect the range of the measured variables. The first sample in Table 3 represents the data for the control, or untreated material. Baseline values for raw GBW may vary as much as three percentage points from year to year or even between widely separated GBW sources during the same year. In general, the in vitro percent OMD of raw gin waste will fall somewhere between 35% to 40%.

TABLE 3

| SAMPLE # | pH | % DM | % OMO | % ASH | % DMD | % OMD |
|---|---|---|---|---|---|---|
| CONTROL | — | 90.5 | 89.2 | 10.8 | 33 | 38.8 |
| 1 | 5.98 | 60.6 | 88 | 12 | 49 | 51.3 |
| 2 | 9.63 | 40.5 | 81.3 | 18.7 | 54.9 | 57.7 |
| 3 | 11.81 | 42.5 | 83 | 37 | 62.2 | 66.8 |
| 4 | 9.96 | 60.1 | 80.6 | 19.4 | 43.4 | 45.3 |
| 5 | 6.18 | 40.7 | 87 | 13 | 64.4 | 66 |
| 6 | 10.95 | 62.3 | 77.7 | 22.3 | 44.8 | 47.5 |
| 7 | 12.19 | 45.4 | 51.6 | 48.4 | 76 | 76.8 |
| 8 | 6 | 79.3 | 87.6 | 12.4 | 38.3 | 40.9 |
| 9 | 9.59 | 98.4 | 79 | 21 | 40.8 | 45.5 |
| 10 | 9.83 | 98.3 | 80.5 | 19.5 | 38.9 | 45.5 |
| 11 | 9.56 | 91.9 | 81.4 | 18.6 | 30.2 | 32.6 |
| 12 | 9.08 | 98.7 | 83.2 | 16.8 | 39.1 | 42.2 |
| 13 | 8.63 | 60.3 | 86.3 | 13.7 | 49.7 | 50.7 |
| 14 | 7.76 | 99.2 | 86.2 | 13.8 | 35 | 38.4 |
| 15 | 9.75 | 99.1 | 83.2 | 16.8 | 39.4 | 42.2 |
| 16 | 9.7 | 40.1 | 81.4 | 18.6 | 58.5 | 63.3 |
| 17 | 9.34 | 80.4 | 85.2 | 14.8 | 40.9 | 44.2 |

TABLE 3-continued

| SAMPLE # | pH | % DM | % OMO | % ASH | % DMD | % OMD |
|---|---|---|---|---|---|---|
| 18 | 10.7 | 80.3 | 81.3 | 18.7 | 35.7 | 40.4 |
| 19 | 10.01 | 79.7 | 83 | 17 | 36 | 39.9 |
| 20 | 9.67 | 80.3 | 85.8 | 14.2 | 35.8 | 37.7 |
| 21 | 5.87 | 82.6 | 88.5 | 11.5 | 41.7 | 45.6 |
| 22 | 10.97 | 62.6 | 73.8 | 26.2 | 47.5 | 52.2 |
| 23 | — | 83.3 | 75.8 | 24.2 | 50.4 | 53.6 |
| 24 | — | 83.7 | 76.4 | 23.6 | 50.4 | 53.7 |
| 25 | — | 83.3 | 82.3 | 17.7 | 51.5 | 59 |
| 26 | — | 83.5 | 83.1 | 16.9 | 50.6 | 59 |
| 27 | — | 84.5 | 83.1 | 16.9 | 48.2 | 53.4 |

UTILIZATION OF MIXED-OXIDANT PREDIGESTED COTTON GIN TRASH BY GROWING STEERS

An in depth series of laboratory evaluations was used to determine the effectiveness of various combinations of chemicals and rates of application on in vitro digestibility of cotton gin trash (CGT). Based on data from in vitro evaluations of CGT, a metabolism experiment with growing steers was used to determine the relative value of the best combinations of chemicals, when applied to cotton gin trash, as compared to untreated (negative control) and good quality alfalfa hay (positive control).

Interpretation of the in vitro data was based on physiochemical changes in the CGT following chemical processing—the impact these changes had on utilization by rumen microorganisms—and how these changes affected the extent of gastric (acid/pepsin) digestion. Whereas, treatment effects in the steer metabolism experiment were based on direct comparisons for overall diet digestibility, digestibility of organic matter and crude protein, and nitrogen (crude protein) utilization by steers.

EXAMPLE 12

Steer Metabolism Experiment

Four treatments (alfalfa hay; untreated CGT; NaOH plus mixed oxidant treated CGT; and mixed oxidant (only) treated CGT) were compared for effects on overall diet digestibility, nitrogen utilization and feed intake. Growing steers were used and fed diets that contained 10% of each respective roughage source on a dry matter basis and 90% of a steam flaked grain sorghum, soybean meal concentrate with supplemented minerals and vitamins.

Ash and crude protein contents of the alfalfa hay, un treated CGT, NaOH plus mixed oxidant treated, and mixed oxidant treated were 4.1, 13.8; 3.9, 13.7; 4.5, 13.7; and 4.3, 13.8%, respectively. Since feed intake was somewhat lower for the alfalfa treatment, this resulted in less consumption of dry matter, organic matter and crude protein which in its self enables animals to achieve a higher digestibility. Dry matter digestibility (DMD) was similar (P>0.05) for the alfalfa and NaOH plus mixed oxidant treatments, and both were higher (P<0.05) than the untreated CGT. Organic matter digestibility (OMD) was similar (P>0.05) for the alfalfa, NaOH plus mixed oxidant, and mixed oxidant treatments, but only the alfalfa treatment resulted in higher (P>0.05) values than the untreated CGT. Nitrogen retention values were similar (P 0.05) across all treatments, but all diets with CGT were lower (P<0.05) than the alfalfa treatment in crude protein digestibility.

These data indicate that the chemical treatment of CGT with a combination of sodium hydroxide (NaOH) and mixed oxidizers, or mixed oxidizers alone improve the utilization of CGT by growing steers: and inclusion of chemically oxidized CGT at 10% of the diet dry matter approaches the feeding value of 10% tubground alfalfa hay in overall utilization.

Low quality roughages contain relatively high amounts of lignified structural carbohydrates that are low in digestibility. Various chemical treatment processes have been studied as a method of processing low quality roughages that breaks bonding in the lignified matrices, thus freeing potentially digestible carbohydrates for attack by rumen microorganisms. Effects on the digestibility of various roughages that results from sodium hydroxide (NaOH) treatment are well documented (Arndt and Richardson, 1980; Arndt et al., 1982; Beckmann, 1921; Archibald, 1924; Rexen and Thomsen, 1976; Jackson, 1977; Klopfenstein, 1978). The combination of NaOH and hydrogen peroxide ($H_2O_2$) has been reported to further increase the structural breakup of the lignocellulose matrix and extend the digestibility of wheat straw (Gould et al., 1989).

Some of the benefits that scientists and/or livestock feeders have attributed to the use of various types of chemically processed roughages in feeding programs include: improved gains; improved feed efficiency; increased feed intake; decreased cost of gain; decreased dustiness; improved handling properties; improved associative effects during rumen fermentation; improved digestibility of energy components enough to meet animal maintenance requirements. However, the lack of a clear economic advantage for using any of the various treatment processes tested on CGT has discouraged commercialization.

EXPERIMENTAL PROCEDURES

Steer metabolism experiment. Eight growing steers of similar weight were used in a metabolism experiment utilizing a 4×4 Latin square design to determine the effects of mixed oxidizers processed cotton gin trash (CGT) on feed intake; diet digestibility of dry matter (DMD), organic matter (OMD), crude protein; and nitrogen utilization. All steers were adjusted to a common diet for 21 days and then randomly assigned to treatment groups. Steers were then immediately placed in metabolism crates for total collections of urine and feces. Each 7 day collection period was preceded by a 10 day adjustment to that respective dietary treatment. This design allowed all steers to be on each dietary treatment and accounts for differences in animal variations.

Dietary treatments (Table 4) were decided upon after all laboratory data were available from in vitro evaluations. Diets were 90% concentrate and 10% roughage. Roughage treatments were: alfalfa hay; untreated CGT; NaOH plus mixed-oxidant treated CGT; mixed-oxidant treated (CGT). Roughages were included in all diets at 10% on a dry matter basis. All diets were formulated to be equal in crude protein.

Animals were housed in a thermostatically controlled laboratory with constant lighting. Feed was offered at 0730 and 1730 hours. Samples of dietary treatments were collected at each a.m. feeding and composited for subsequent analyses. Feed refusals were weighed and sampled daily. Urine was collected in acidified containers and emptied as needed, then stored in a refrigerator until the end of each collection period at which time the total volume was thoroughly blended and an aliquot taken for analyses. Fecal collections were taken daily and stored for subsequent analyses.

Chemical predigestion of the CGT treated with the combination of NaOH plus mixed oxidants was accomplished by first applying a 50% solution of NaOH, then applying the mixed oxidant solution which contained approximately 1,500 ppm of oxidizers. The initial moisture content of the CGT averaged 10%, and the final (target) moisture content of the treated CGT was 20%. To achieve the desired application rate of NaOH and final moisture content, the following procedures were followed. Approximately one ton of tub-ground CGT was placed in an Oswalt feed mixer truck and mixed during the application of chemicals and for 20 minutes after the application process was completed. Sodium hydroxide was sprayed on the CGT at a rate of 8.0 lb. of a 50% solution per 96 lb. of ground CGT dry matter (4 parts NaOH per 96 parts of CGT). Then, the mixed oxidant solution was immediately applied by spray to achieve the 20% moisture content. This involved the addition of 6% moisture from the oxidizer solution that contained 1,500 ppm of mixed oxidants.

Application of the mixed oxidants alone simply involved the spraying of the oxidizer solution on ground CGT to achieve 20% total moisture. Mixed oxidizers used in this treatment were at the same concentration (about 1500 ppm) as used in the other treatment. However, this treatment provided 40% more, total, oxidizers per unit of dry matter than the previous treatment described.

Statistical Analyses. Data from the steer metabolism experiment were analyzed as an analysis of variance for Latin squares and means separated by Tukey's studentized range test.

Composition of the four diets is shown in Table 4. All diets were formulated to be equal in crude protein on a dry matter basis and subsequent analyses of the mixed diets found them to contain an average of 13.75% crude protein. Ash contents of the diets ranged from 3.9 to 4.5%. The CGT used in all diets was of similar quality and obtained in a single load from the same source. It was ground through a tub-grinder equipped with a two inch screen prior to chemical treatment, or being fed in the untreated form. The alfalfa hay was tub-ground using the same size screen as used for the CGT. All diets were formulated on a dry matter basis, but those containing CGT were not nutritionally balanced (except for crude protein equivalents) with the diet containing alfalfa.

Data resulting from the metabolism study are presented in Tables 5, 6, 7 and 8 and summarized in Table 9. While intake was similar (P>0.05) across all treatments, steers consumed an average of 12% more feed when fed the chemically oxidized CGT as compared to alfalfa hay.

TABLE 4

COMPOSITION OF DIETS[a]

| INGREDIENT | Alfalfa | Untreated Gin Trash | NaOH + Mixed Oxidants | Mixed Oxidants |
|---|---|---|---|---|
| | | | % | |
| Grain sorghum steam flaked, dried | 78.79 | 78.39 | 78.39 | 78.39 |
| Alfalfa hay, ground | 10.00 | — | — | — |

TABLE 4-continued

COMPOSITION OF DIETS[a]

| INGREDIENT | Alfalfa | Untreated Gin Trash | NaOH + Mixed Oxidants | Mixed Oxidants |
|---|---|---|---|---|
| | | | % | |
| Gin trash, ground | — | 10.00 | 10.00 | 10.00 |
| Soybean meal | 9.00 | 9.00 | 9.00 | 9.00 |
| Urea | — | .40 | .40 | .40 |
| Salt, plain | .45 | .45 | .45 | .45 |
| Calcium carbonate | .90 | .90 | .90 | .90 |
| Trace mineral premix | .45 | .45 | .45 | .45 |
| Vitamin A premix | .41 | .41 | .41 | .41 |

[a]Dry matter basis

TABLE 5

DRY MATTER INTAKE BY GROWING STEERS[a] (g/day)

| Collection period | Alfalfa | Untreated Gin Trash | NaOH + Mixed Oxidants | Mixed Oxidants |
|---|---|---|---|---|
| 1 | 4,802 | 6,284 | 5,774 | 5,127 |
|   | 5,431 | 4,802 | 3,944 | 6,360 |
| 2 | 4,280 | 6,349 | 6,269 | 6,374 |
|   | 5,978 | 5,331 | 6,353 | 6,360 |
| 3 | 5,605 | 6,232 | 6,392 | 6,407 |
|   | 3,954 | 5,446 | 6,388 | 5,206 |
| 4 | 6,209 | 6,373 | 6,401 | 6,135 |
|   | 6,320 | 6,284 | 6,205 | 6,031 |
| MEAN | 5,322[b] | 5,888[b] | 5,966[b] | 6,000[b] |

[a]Steers were kept in metabolism crates, housed in a thermo-statically controlled laboratory. Feed was offered twice daily at 0730 and 1700 hours during the 68-day experiment.
[b]Means are not different (P < .05).

TABLE 5

EFFECTS OF FEEDING MIXED-OXIDANT PREDIGESTED COTTON GIN TRASH ON DRY MATTER DIGESTIBILITY BY GROWING STEERS[a]

| Collection period | Alfalfa | Untreated Gin Trash | NaOH + Mixed Oxidants | Mixed Oxidants |
|---|---|---|---|---|
| 1 | 87.52 | 80.00 | 86.87 | 82.10 |
|   | 87.00 | 80.95 | 85.43 | 80.30 |
| 2 | 85.94 | 83.49 | 82.57 | 83.59 |
|   | 87.19 | 80.07 | 80.45 | 83.54 |
| 3 | 90.20 | 77.73 | 83.15 | 78.82 |
|   | 86.17 | 76.13 | 86.23 | 81.06 |
| 4 | 87.48 | 82.45 | 83.20 | 88.24 |
|   | 84.71 | 81.12 | 83.61 | 85.12 |
| *MEAN | 87.03[c] | 80.24[e] | 83.94[c,d] | 82.85[d,e] |

[a]4 × 4 Latin square design involving a total of 8 steers per treatment.
[b]Roughage treatment comprised 10% of the diet.
[c,d]Means in the same row with different superscripts differ (P < .05).
*Probability level
Alfalfa vs NaOH + mixed oxidants = .102
Alfalfa vs mixed oxidants = .043
Untreated gin trash vs NaOH + mixed oxidants = .008
Untreated gin trash vs mixed oxidants = .029

TABLE 7

EFFECTS OF FEEDING MIXED-OXIDANT PREDIGESTED COTTON GIN TRASH ON ORGANIC MATTER DIGESTIBILITY BY GROWING STEERS[a]

| Collection period | Alfalfa | Untreated Gin Trash | NaOH + Mixed Oxidants | Mixed Oxidants |
|---|---|---|---|---|
| 1 | 88.25 | 81.31 | 88.02 | 83.46 |
|   | 87.82 | 83.08 | 86.75 | 81.79 |
| 2 | 86.85 | 84.73 | 84.15 | 85.39 |
|   | 88.07 | 81.75 | 81.96 | 85.47 |
| 3 | 91.15 | 79.20 | 84.35 | 80.62 |

TABLE 7-continued

EFFECTS OF FEEDING MIXED-OXIDANT PREDIGESTED COTTON GIN TRASH ON ORGANIC MATTER DIGESTIBILITY BY GROWING STEERS[a]

| Collection period | Alfalfa | Untreated Gin Trash | NaOH – Mixed Oxidants | Mixed Oxidants |
|---|---|---|---|---|
| | 87.61 | 77.74 | 87.86 | 78.23 |
| 4 | 88.56 | 83.98 | 84.68 | 89.71 |
| | 85.60 | 82.45 | 85.08 | 86.93 |
| *MEAN | 87.99[c] | 81.78[d] | 85.36[c] | 83.95[c,d] |

[a] 4 Latin square design involving a total of 8 steers per treatment.
[b] Roughage treatment comprised 10% of the diet.
[c,d] Means in the same row with different superscripts differ (P < .05).
*Probability level
Alfalfa vs NaOH – mixed oxidants = .132
Alfalfa vs mixed oxidants = .067
Untreated gin trash vs NaOH – mixed oxidants = .045
Untreated gin trash vs mixed oxidants = .149

TABLE 8

EFFECTS OF FEEDING MIXED-OXIDANT PREDIGESTED COTTON GIN TRASH ON NITROGEN RETENTION BY GROWING STEERS[a]

| Collection period | Alfalfa | Untreated Gin Trash | NaOH – Mixed Oxidants | Mixed Oxidants |
|---|---|---|---|---|
| 1 | — | 74.10 | 59.83 | 22.09 |
| | 53.63 | 13.07 | — | 81.03 |
| 2 | — | 66.43 | 49.65 | 86.43 |
| | 85.87 | — | 68.32 | 71.60 |
| 3 | 58.40 | 53.52 | 77.01 | 65.10 |
| | — | 21.45 | 69.77 | — |
| 4 | 80.40 | 76.15 | 65.67 | 70.43 |
| | 96.29 | 73.65 | 31.95 | — |
| *MEAN | 74.92[c] | 54.05[c] | 60.31[c] | 66.11[c] |

[a] 4 Latin square design involving a total of 8 steers per treatment. Least squares means: steers with a negative nitrogen retention average were not included in the data base.
[b] Roughage treatment comprised 10% of the diet.
[c] Means are not different (P > .05).
*Probability level
Alfalfa vs untreated gin trash = .366
Untreated gin trash vs NaOH – mixed oxidants = .669
Untreated vs mixed oxidants = .345

TABLE 9

INTAKE, DIGESTIBILITY AND NITROGEN UTILIZATION BY GROWING STEERS[a]

| ITEM | Alfalfa hay (ground) | Untreated Gin Trash | NaOH – Mixed Oxidants | Mixed Oxidants | SE[c] |
|---|---|---|---|---|---|
| Intake, g/day Dry matter | 5,322[d] | 5,888[d] | 5,966[d] | 6,000[d] | |
| Apparent digestibility, % | | | | | |
| Dry matter | 87.0[d] | 80.2[f] | 83.9[d,e] | 82.9[e,f] | .433 |
| Organic matter | 88.0[d] | 81.8[e] | 85.4[d,e] | 84.0[d,e] | .575 |
| Crude protein | 75.0[d] | 61.2[f] | 70.4[e] | 70.6[e] | .592 |
| *Nitrogen utilization, Retention, g/day | 74.9[d] | 54.1[d] | 60.3[d] | 66.1[d] | 36.5 |

[a] 4 Latin square with two animals per cell for a total of 8 animals per treatment.
[b] Gin trash in all treatments was ground via a tub grinder fitted with a 2 inch screen.
[c] Standard error of the mean.
[d,e,f] Means in the same row with different superscripts differ (P < .05).
*Least squares means.

Apparent digestibility values for DMD, OMD and crude protein are presented as intake minus excretion. Both treatments with chemically oxidized CGT were similar (P 0.05) in overall diet OMD as compared to the diet containing alfalfa hay. Crude protein digestibility was higher (P>0.05) in both diets containing oxidized CGT over untreated CGT.

Furthermore, crude protein digestibility was higher (P>0.05) when alfalfa hay was fed as compared to feeding chemically oxidized CGT. However, nitrogen retention (which is a direct indicator of growth rate) was not different (P>0.05) across treatments because of the greater variation within treatments.

In summary, these results indicate that the digestibility of organic matter from diets containing 10% chemically oxidized CGT is similar to OMD by steers fed a steam flaked grain sorghum based diet with 10% tub-ground alfalfa hay. These data also show that chemically oxidized CGT tends to improve intake by growing steers over tub-ground alfalfa hay. Overall, the findings of this study indicate that chemically oxidized CGT is a viable roughage source for growing steers.

While this invention has been described fully and completely, with special emphasis on several preferred embodiments, it should be understood that, within the scope of the appended claims, the invention may be practiced otherwise than as specifically described.

I claim:

1. A method for treating ligno-cellulosic wastes to render them non-toxic improved in digestibility and edible by ruminants, which comprises
providing a mixed oxidant gas generator comprising a hollow container having a wall dividing the same into two compartments and including an ion-permeable membrane permitting flow of cations therethrough,
a cathode in one of said compartments,
an anode in the other of said compartments,
providing water to said cathode compartment,
providing a water solution of a chloride salt to said anode compartment,
passing a predetermined amount of direct current through said water and said chloride salt solution to produce a mixed oxidant gas in said anode compartment and to produce hydrogen and sodium hydroxide in said cathode compartment,
collecting said mixed oxidant gas in alkaline solution at a pH of 7.5-12.0 sufficient to produce a solution containing 0.01-7.0% mixed oxidant in the form of a mixture of salts of the formula $NaClO_x$ where $x = 1-7$,
providing a quantity of cellulosic wastes, and
treating said cellulosic wastes with said mixed oxidant solution in amounts sufficient to produce a pH of at least 11.0 and total water content of less than 20% is said wastes, said mixed oxidant gas being present in an amount sufficient to convert said wastes after several hours reaction time into a form edible by ruminants.

2. A method according to claim 1 in which
said mixed oxidant solution contains 0.12-0.15% mixed oxides.

3. A method according to claim 1 in which
said mixed oxidant solution contains added NaOH.

4. A method according to claim 1 in which
said cellulosic wastes comprise the shell of whole grains, straw, corn stalks or husks, cotton gin trash, peanut shells, or saw dust.

5. A method according to claim 1 in which
said cellulosic wastes are treated to produce a pH of 11.4-11.7 thereon.

6. A method according to claim 1 which said wastes are stored for a time ranging from a few hours to several days to complete the reaction converting said wastes into edible form before feeding to ruminants.

7. A method according to claim 1 in which said treated wastes, after completion of reaction, contain cellulose and sugars in a form digestible by ruminants.

8. A method according to claim 1 in which said ligno-cellulosic wastes are comminuted before treatment with said mixed oxidant solution.

9. A method according to claim 1 in which said mixed oxidant gas generator includes an additional electrode positioned in said anode compartment maintained at an electric potential lower than said anode relative to said cathode, said anode and said cathode being operable when so filled and energized to produce hydrogen at said cathode and a mixed oxidant gas comprising a mixture of chlorine, oxygen and other oxygen species at said anode and at said additional electrode when operated at relatively low salt concentration.

10. A method according to claim 9 in which said additional electrode is a bipolar electrode.

11. A method according to claim 9 in which at least one of the electrodes of said oxidant gas generator has a surface area different from other electrodes.

12. A method according to claim 10 in which there are a plurality of said bipolar electrodes in said oxidant gas generator.

13. A method according to claim 10 in which said ion-permeable membrane comprises only part of said wall of said oxidant gas generator.

14. A method according to claim 10 in which said wall surrounds said second compartment and said first compartment surrounds said wall in said oxidant gas generator.

15. A method according to claim 10 in which said oxidant gas generator container includes openings for introduction of water and a chloride salt and openings for removal of sodium hydroxide and of hydrogen and oxidant gases.

16. A method according to claim 10 in which said oxidant gas generator ion-permeable membrane comprises a perfluorosulfonic polymer.

17. A method according to claim 10 in which said oxidant gas generator ion-permeable membrane comprises a woven membrane of KANECARON fibers, a modacrylic composition of acrylic polymeric structure having 35–85% wt. acrylonitrile units.

18. A method according to claim 10 in which said oxidant gas generator ion-permeable membrane comprises a woven membrane of KANECARON fibers, a modacrylic composition of acrylic polymeric structure having 50% acrylonitrile and 50% vinyl chloride fibers.

19. An edible feed for ruminants produced according to the method of claim 1.

20. An edible feed product comprising one part of a product produced according to claim 1 admixed with 9 parts of edible hay or grain.

* * * * *